(12) United States Patent
Kitaoka et al.

(10) Patent No.: US 6,501,868 B1
(45) Date of Patent: Dec. 31, 2002

(54) OPTICAL WAVEGUIDE DEVICE, COHERENT LIGHT SOURCE, INTEGRATED UNIT, AND OPTICAL PICKUP

(75) Inventors: Yasuo Kitaoka, Osaka (JP); Kenichi Kasazumi, Osaka (JP); Kiminori Mizuuchi, Osaka (JP); Kazuhisa Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 71 days.

(21) Appl. No.: 09/687,118

(22) Filed: Oct. 13, 2000

(30) Foreign Application Priority Data

Oct. 15, 1999 (JP) .......................... 11-294623

(51) Int. Cl.$^7$ .............................................. G02B 6/12
(52) U.S. Cl. ............................. 385/14; 385/130; 385/37
(58) Field of Search ........................ 385/14, 129, 130, 385/132, 88, 92–94, 37; 369/44.32, 44.23, 44.15

(56) References Cited

U.S. PATENT DOCUMENTS 5,263,111 A * 11/1993 Nurse et al. ................. 385/130
5,621,716 A * 4/1997 Kojima et al. ......... 369/112.07
6,118,908 A * 9/2000 Bischel et al. ............... 385/130

FOREIGN PATENT DOCUMENTS

JP 9-145945 6/1997

OTHER PUBLICATIONS

Uchida et al., "Low Loss Micro–Machining of Optical Surface Mount Substrates", The Spring Convention of the Institute of Electronics, Information and Communication Engineers of Japan, C–328, 1994, 1 page.

* cited by examiner

Primary Examiner—Ellen E. Kim
(74) Attorney, Agent, or Firm—RatnerPrestia

(57) ABSTRACT

An optical waveguide device comprises a substrate having first and second surfaces, and an optical waveguide provided on the first surface of the substrate, having a light-incoming facet and a facet inclined with respect to the optical waveguide. Guided light incident to the optical waveguide through the light-incoming facet is totally reflected off the inclined facet, and the guided light is transmitted through the first or second surface of the substrate.

69 Claims, 17 Drawing Sheets

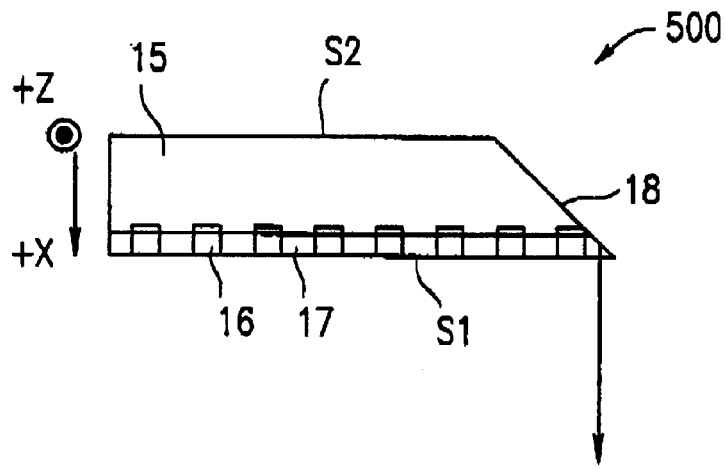
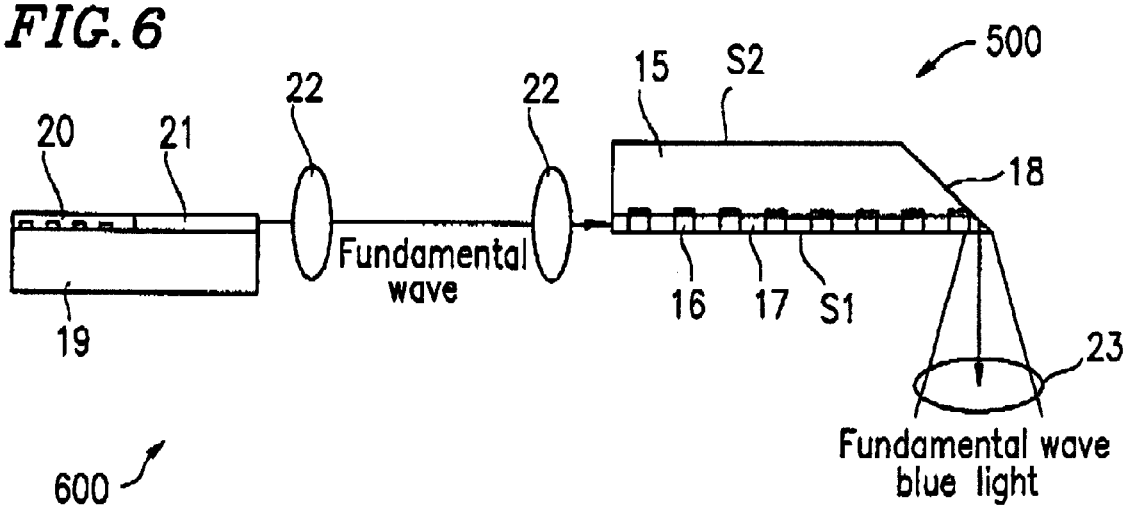

Fundamental wave blue light

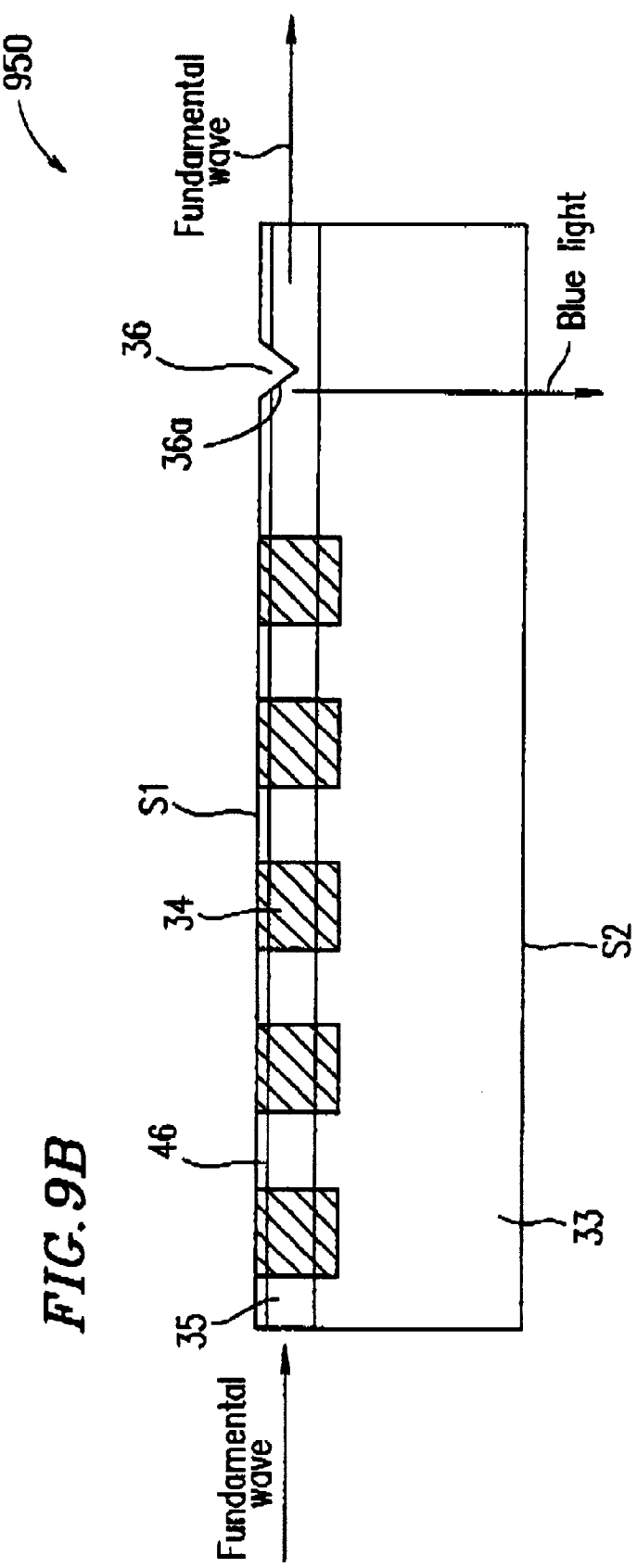

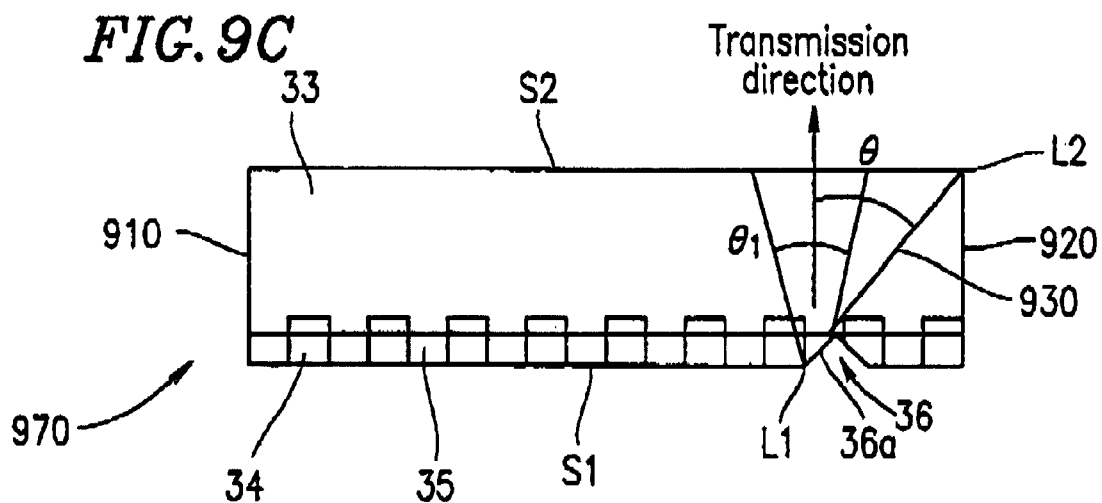
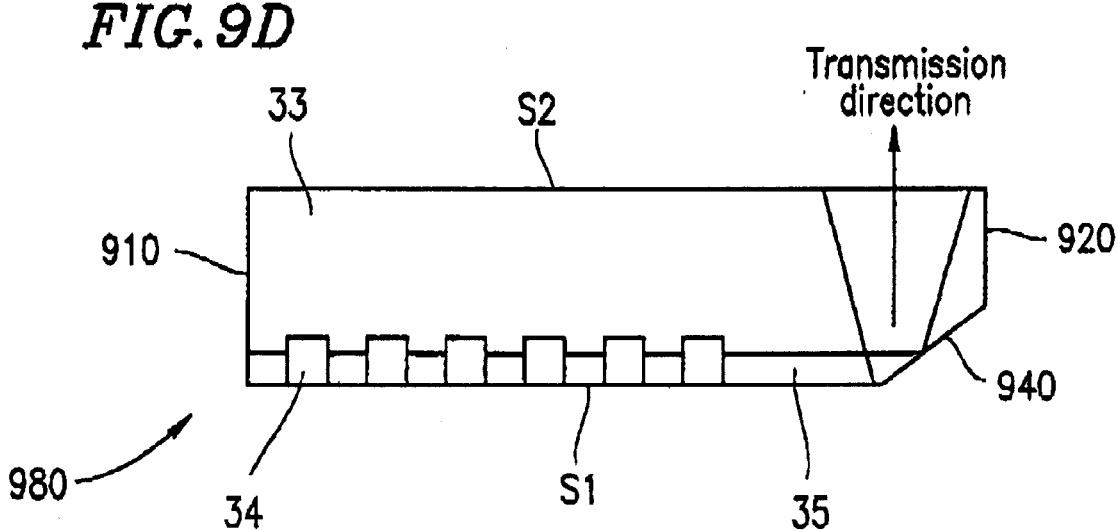

Index ellipsoid of birefringence sealing plate

Index ellipsoid of waveguide substrate

OPTICAL WAVEGUIDE DEVICE, COHERENT LIGHT SOURCE, INTEGRATED UNIT, AND OPTICAL PICKUP

BACKGROUND OF THE INVENTION

1. Field of the Invention

The present invention relates to an optical waveguide device and a coherent light source for use in a field such as optical information processing or optical communication. The present invention also relates to an integrated unit and an optical pickup device including the optical waveguide device or the coherent light source.

2. Description of the Related Art

In the optical information processing field, a small-sized light source for emitting light having a short wavelength is required for achieving high-density optical disks and high-definition displays. There are know techniques for generating light having a short wavelength. An example of such a technique is a second harmonic generation (hereinafter referred to as "SHG") technique using a semiconductor device and an optical waveguide wavelength conversion (Yamamoto et al., Optics Letters Vol. 16, No. 15, 1156 (1991)) device using quasi phase matching (hereinafter referred to as "QPM").

FIG. 20 is a diagram schematically showing a structure of a SHG blue laser 2000 using an optical waveguide type wavelength conversion device 83. Herein, a tunable semiconductor laser 80 having a distribution Bragg reflection (hereinafter referred to as "DBR": Distributed Bragg reflector) region is employed. A tunable semiconductor laser having a DBR region is hereinafter referred to as a tunable DBR semiconductor laser. The tunable DBR semiconductor laser 80 is an AlGaAs DBR semiconductor laser whose input is in a power range of around 100 mW and whose oscillated wavelength is in a band range of around 0.85 $\mu$m. The tunable DBR semiconductor laser 80 includes an active region 81 and a DBR region 82. The oscillation wavelength of the semiconductor laser 80 can be adjusted by changing an amount of current injected into the DBR region 82. The optical waveguide type wavelength conversion device 83 includes an optical waveguide 84 and a periodic polarization inversion region 85 on an X-plate MgO-doped LiNbO$_3$ substrate (the X axis of crystal is substantially perpendicular to the substrate). Laser light emitted from a facet of the tunable DBR semiconductor laser 80 is coupled with the optical waveguide 84 of the optical waveguide type wavelength conversion device 83. With the configuration of FIG. 20, about 60 mW laser light out of about 100 mW laser output is coupled with the optical waveguide 84. By controlling the amount of current injected into the DBR region 82 of the tunable DBR semiconductor laser 80, the oscillation wavelength is fixed to fall within a wavelength allowance range of phase matching of the optical waveguide type wavelength conversion device 83, resulting in about 10 mW blue light having a wavelength of about 425 nm.

Such as SHG blue laser may be used for an optical disk recording and reproduction apparatus. Referring to FIG. 21, an SHG blue laser 2000 is mounted in an optical pickup 2100. A module (the SHG blue laser 2000) emits blue light which is in turn collimated by a collimator lens 86 and transmitted through a polarizing beam splitter 87 (hereinafter referred to as "PBS") and a quarter-wave plate 88. Thereafter, the blue light is bent into a 90° angle (substantially perpendicular to the plane of the figure) by a raising mirror (not shown) and converged by an objective lens 89 onto an optical disk 95. The light is reflected by the optical disk 95 and is bent into a 90° angle by the PBS 87. The light is guided into a photodetector 91 (hereinafter referred to as "PD") by a detection lens system 90 including a detection lens and a cylindrical lens. The photodetector 91 performs signal detection. With the optical pickup 2100, a high-density optical disk of about 10 GB or more can be reproduced.

Uchida et al., the Spring Convention of the Institute of Electronics, Information and Communication Engineers of Japan, C3. 28, 1994 reports a technique in which a 45° cut is made in an optical waveguide to form a total reflection surface so that output light is in a direction substantially perpendicular to a substrate (see FIG. 22). In this case, an optical waveguide 93 of glass is formed by conducting double ion exchange on a glass substrate 92. A 45° cut 94 is provided in the optical waveguide 93 by microprocessing. The processing is performed using an appropriate blade. The sides of the cut 94 are polished at the time of cutting so that a reflection surface whose loss is as low as 0.3 dB can be obtained.

Recently, there is a demand for small and thin optical pickups as computers are being downsized. In order to achieve smaller and thinner optical pickups, it is important to downsize not only a light source of the optical pickup, but also the configuration of the optical pickup. In this case, it is also important to take measures against returning light, interference noise, or the like described below.

1) Small and thin optical pickup

In the configuration of the conventional optical pickup 2100 of FIG. 21, the optical axis of the module is parallel to the optical axis of the optical pickup 2100. Therefore, the optical pickup 2100 is longer in the optical axis direction than in the width. When a semiconductor laser chip is employed, such an element is about 1 mm or less long, which is not problematic. In contrast, the SHG blue laser 2000 includes the optical waveguide type tunable device and the semiconductor laser. This causes the module size to be as long as 10 mm. The optical pickup 2100 becomes extremely long. Further, in the configuration of FIG. 21, the light detection system (the detection lens, the cylindrical lens, and the PD) is separated from the other parts of the optical pickup, causing the optical pickup to be large.

2) Measures against returning light

In the module including the semiconductor laser and the optical waveguide device, light reflected off the light-exiting facet of the optical waveguide is returned to the semiconductor laser. This causes the semiconductor laser to be in a multi-longitudinal mode, whereby noise characteristics are impaired.

3) Reduction in interference noise

In the SHG blue laser 2000, blue light is obtained by converting the wavelength of the semiconductor laser light which is used as a fundamental wave. Therefore, even if part of reflected light from the outside is returned to the semiconductor laser, the returning light does not contribute to noise. As a result, the semiconductor laser can be operated in a single mode, thereby obtaining a low level of noise (about −140 dB/Hz or less). However, blue light is highly coherent, so that if a cavity structure is externally provided, the amplitude of the blue light varies due to interference as the cavity condition is changed. In the configuration of the optical pick 2100 of FIG. 21, the surface of an optical disk 95 and the light emitting facet of the optical waveguide type wavelength conversion device form a confocal optical system. Therefore, as the optical disk is rotated changing a cavity condition, the intensity of light received by the PD 91 varies, causing deterioration of a signal waveform upon reproduction of the optical disk 95.

SUMMARY OF THE CONVENTION

According to one aspect of the present invention, an optical waveguide device comprises a substrate having first and second surfaces; and an optical waveguide provided on the first surface of the substrate, having a light-incoming facet and a facet inclined with respect to the optical waveguide. Guided light incident to the optical waveguide through the light-incoming facet is totally reflected off the inclined facet, and the guiding light is transmitted through the first or second surface of the substrate.

In one embodiment of this invention, the guided light is transmitted through the first surface of the substrate.

In one embodiment of this invention, the guided light is transmitted through the second surface of the substrate.

In one embodiment of this invention, the substrate is made of a nonlinear optical material, the guided light incident to the optical waveguide as a fundamental wave is wavelength converted into a second harmonic wave, and the second harmonic wave is transmitted.

In one embodiment of this invention, the second harmonic wave is transmitted through the second surface of the substrate.

In one embodiment of this invention, a thickness of the substrate is about 0.3 mm or more and about 1.0 mm or less.

In one embodiment of this invention, a non-reflection portion is provided on the first surface of the substrate in which the second harmonic wave is substantially not reflected off the non-reflection portion.

In one embodiment of this invention, the non-reflection portion is made of antireflection coating.

In one embodiment of this invention, the second harmonic wave is transmitted through the first surface of the substrate.

In one embodiment of this invention, a non-reflection portion is provided on the first surface of the substrate in which the second harmonic wave is substantially not reflected off the non-reflection portion.

In one embodiment of this invention, the non-reflection portion is made of antireflection coating.

In one embodiment of this invention, the an angle attained from intersection of the inclined facet of the optical waveguide and the optical waveguide is about 45±1°.

In one embodiment of this invention, the second harmonic wave has a guide mode.

In one embodiment of this invention, a whole side of the substrate corresponding to the inclined facet of the optical waveguide is inclined with respect to the optical waveguide.

In one embodiment of this invention, the inclined facet of the optical waveguide is a cut provided in the vicinity of the first surface of the substrate, and the cut is substantially perpendicular to the optical waveguide.

In one embodiment of this invention, the inclined facet of the optical waveguide is a groove provided in the vicinity of the first surface of the substrate, and the groove is substantially perpendicular to the optical waveguide.

In one embodiment of this invention, a cladding layer is provided on the first surface of the substrate excluding at least the groove.

In one embodiment of this invention, a cladding layer is provided on the first surface of the substrate.

In one embodiment of this invention, a relationship given by:

$$\sin(\theta) > n_1/n_2$$

is satisfied where $n_1$ is a refractive index of the cladding layer; $n_2$ is an effective refractive index of the optical waveguide with respect to light guided in the optical waveguide; and $\theta$ is an angle attained from intersection of the first surface of the substrate and a normal line to a side of the groove.

In one embodiment of this invention, the inclined facet of the optical waveguide is a side of a groove provided in the vicinity of the first surface of the substrate in which the groove is substantially perpendicular to the optical waveguide; and a relationship given by:

$$t_2 < t < t_1$$

is satisfied where $t_1$ is a depth of a guide mode of a fundamental wave guided in the optical waveguide; $t_2$ is a depth of a guide mode of a second harmonic wave guided in the optical waveguide; and t is a depth of the groove.

In one embodiment of this invention, a cladding layer is further provided on the first surface of the substrate;

the inclined facet of the optical waveguide is a side of a groove provided in the vicinity of the first surface of the substrate in which the groove is substantially perpendicular to the optical waveguide; and a relationship given by:

$$nc_2/nf_2 < \sin(\theta) < nc_1/nf_1$$

is satisfied where $nc_1$ is a refractive index of the cladding layer with respect to the fundamental wave; $nc_2$ is a refractive index of the cladding layer with respect to the harmonic wave; $nf_1$ is a refractive index of the optical waveguide with respect to the fundamental wave; $nf_2$ is a refractive index of the optical waveguide with respect to the harmonic wave; and $\theta$ is an angle attained from intersection of the first surface of the substrate and a normal line to the side of the groove.

In one embodiment of this invention, a diffraction grating is provided on the second surface of the substrate.

In one embodiment of this invention, the substrate is made of a first birefringence optical crystal.

In one embodiment of this invention, the optical waveguide device further comprises a second birefringence optical crystal provided in an optical path of the transmitted light. An optical axis of the second birefringence optical crystal is orthogonal to an optical axis of the first birefringence optical crystal of the substrate.

In one embodiment of this invention, one of the first and second surfaces is substantially in a shape of a cylinder in which the guided light is transmitted through the one of the first and second surfaces.

In one embodiment of this invention, the optical waveguide device further comprises a cylindrical lens provided in an optical path of the guided light transmitted from the optical waveguide device.

In one embodiment of this invention, the optical waveguide device further comprises a concave package. The optical waveguide device is provided in the concave package; and the concave package is sealed by the second birefringence crystal.

In one embodiment of this invention, the optical waveguide device further comprises a concave package. The optical waveguide device is provided in the concave package; and the concave package is sealed by the cylindrical lens.

In one embodiment of this invention, the substrate has a first facet including the light-incoming facet of the optical waveguide and a second facet opposite the first facet; an angle attained from intersection of a plane including a line of intersection of the inclined facet and the first surface of the substrate and a line of intersection of the second facet and the second surface of the substrate, and a direction in which the guided light is transmitted, is greater than half a divergence angle of the guided light transmitted through the second surface of the substrate.

In one embodiment of this invention, a relationship given by:

$$\theta_1/2 < \theta$$

is satisfied where $\theta$ is an angle attained from intersection of a plane including a line of intersection of the inclined facet and the first surface of the substrate and a line of intersection of the second facet and the second surface of the substrate, and a direction in which the guided light is transmitted; and $\theta_1$ is a divergence angle of the guided light output through the second surface of the substrate.

In one embodiment of this invention, the wideguide device further comprises a periodic polarization inversion region provided in the first surface of the substrate.

In one embodiment of this invention, the periodic polarization inversion region is not provided in the vicinity of the inclined facet of the optical waveguide.

According to another aspect of the present invention, a coherent light source comprises a semiconductor laser and the optical waveguide device of the present invention.

In one embodiment of this invention, the semiconductor laser is a tunable semiconductor laser.

In one embodiment of this invention, a distance between a light-exiting facet of the semiconductor laser and the light-incoming facet of the optical waveguide is about 0 $\mu$m or more and about 10 $\mu$m or less.

According to another aspect of the present invention, an integrated unit comprises a coherent light source including a semiconductor laser and the optical waveguide device of the present invention in which light from the semiconductor laser is incident to the optical waveguide; a photodetector for detecting light associated with the light transmitted from the optical waveguide device; and a submount in which the coherent light source and the photodetector are provided on the same surface of the submount.

In one embodiment of this invention, the integrated unit further comprises a light shielding member provided between the coherent light source and the photodetector.

In one embodiment of this invention, a height of a surface of the photodetector is higher than a surface on a light-exiting side of the coherent light source with reference to a surface of the submount.

In one embodiment of this invention, a concave portion is provided in a surface of the submount; and the coherent light source is provided in the concave portion.

According to another aspect of the present invention, an integrated unit comprises a coherent light source including a semiconductor laser and the optical waveguide device of the present invention in which light from the semiconductor laser is incident to the optical waveguide device; a photodetector for detecting light associated with the light transmitted from the optical waveguide device; and a submount having a first surface and a second surface opposite the first surface in which the coherent light source is provided on the first surface of the submount and the photodetector is provided on the second surface of the submount.

According to another aspect of the present invention, an integrated unit comprises the coherent light source of the present invention; a concave package in which the coherent light source is provided in the concave package; and a transparent substrate for sealing the concave package in which a diffraction grating is provided on a surface of the transparent substrate.

According to another aspect of the present invention, an optical pickup comprises the integrated unit of the present invention; and a focusing optical system for converging light transmitted from the integrated unit. A diffraction grating is provided on a surface of the optical waveguide device of the integrated unit, the guided light being transmitted through the surface.

According to another aspect of the present invention, an optical pickup comprises the integrated unit of the present invention; and a focusing optical system for converging light transmitted from the integrated unit.

In one embodiment of this invention, the photodetector of the integrated unit is divided into at least three regions including a first region positioned at a middle of the photodetector, a second and third regions on opposite sides of the first region; the second and third regions with respect to the first region are provided in a direction substantially perpendicular to a grate of the diffraction grating.

According to another aspect of the present invention, an optical pickup comprises a semiconductor laser; the optical waveguide device of the present invention in which light from the semiconductor laser is incident to the optical waveguide device; two photodetectors for detecting light associated with light transmitted from the the optical waveguide device; a submount in which the coherent and the two photodetectors are provided on the submount; a focusing optical system for converging the light transmitted from the optical waveguide device; and a diffraction element having lens action provided in the focusing optical system. The two photodetector are provided on opposite sides of the optical waveguide device; the two photodetector each have at least a center portion and a peripheral portion; and the two photodetector are irradiated with light diffracted by the diffraction element.

Hereinafter, functions of the present invention will be described.

According to the present invention, an optical waveguide device includes a substrate having a first and second surfaces, and an optical waveguide provided on the first surface of the substrate. Guided light is totally reflected off an inclined facet of the optical waveguide so that the reflected light can be output through the first or second surface. Therefore, in a coherent light source (module) of the present invention including the optical waveguide device and the semiconductor laser, light is transmitted in a direction toward the first or second surface which is different from the optical axis direction of the coherent light source. A small-sized optical pickup can be achieved. Light, which is reflected off the light-exiting facet of the optical waveguide and returned to the semiconductor laser as in the conventional optical waveguide device having a vertical light-exiting facet, is reduced, thereby improving noise characteristics.

When the thickness of the substrate included in the optical waveguide device is less than about 0.3 mm, it is difficult to handle the substrate. When the thickness of the substrate included in the optical waveguide device is more than about 1.0 mm, the astigmatism is large at the focusing light spot. Preferably, the thickness of the substrate is about 0.3 mm or more and about 1.0 mm or less.

When the substrate of the optical waveguide device is made of a nonlinear optical material, and a fundamental wave of the semiconductor laser incident to the optical waveguide of the optical waveguide device is wavelength converted to a second harmonic wave, light (second harmonic wave) externally reflected and returned to the semiconductor laser does not contribute to noise. However, blue light is highly coherent, for example. Therefore, when the second harmonic wave is transmitted through the second surface, an antireflection coating to the second harmonic wave may be preferably provided on the first surface so that the returning light can be prevented from being reflected off the first surface.

According to the present invention, guided light is totally reflected off the inclined facet of the optical waveguide so that the reflected light can be output through the first surface. Therefore, in a coherent light source (module) of the present invention including the optical waveguide device and the semiconductor laser, light is transmitted in a direction toward the first surface which is different from the optical axis direction of the coherent light source. A small-sized optical pickup can be achieved. Light, which is reflected off the light-exiting facet of the optical waveguide and returned to the semiconductor laser as in the conventional optical waveguide device having a vertical light-exiting facet, is reduced, thereby improving noise characteristics.

When the substrate of the optical waveguide deice is made of a nonlinear optical material, and a fundamental wave of the semiconductor laser incident to the optical waveguide of the optical waveguide device is wavelength converted to a second harmonic wave, light (second harmonic wave) externally reflected and returned to the semiconductor laser doe snot contribute to noise. However, in this case, light reaches the first surface immediately after being totally reflected off the inclined surface. Therefore, an antireflection coating to a fundamental wave may be preferably provided on the first surface so that the returning light can be prevented from being reflected off the first surface.

In the optical waveguide device, when the inclined facet of the optical waveguide is inclined at an angel other than about 45° with respect to the optical waveguide, coma aberration occurs at a focusing light spot. Therefore, the inclined facet of the optical waveguide is preferably inclined at an angle of about 45° (45±1°) with respect to the optical waveguide.

Further, when the substrate of the optical waveguide device is made of a nonlinear optical material, and a fundamental wave of the semiconductor laser incident to the optical waveguide of the optical waveguide device is wavelength converted to a second harmonic wave, the harmonic wave is preferably in a guide mode. The thickness of the substrate can be smaller than in a radiation mode so that the astigmatism or the like can be reduced. Moreover, when light in the optical waveguide is in a radiation mode, the thickness of the substrate needs to be increased in order to be transmitted in the substrate direction. When a groove or the like is provided on the first surface so that an inclined facet can be provided, the groove needs to be deep. Taking into account optical disk recording and reproduction apparatus applications, it is difficult to obtain a satisfactory light focus characteristic in the case of the radiation mode.

In the optical waveguide device, a groove or cut may be provided in the vicinity of the first surface, substantially orthogonal to the optical waveguide. A portion (a side) of the groove or cut can be an inclined facet of the optical waveguide. In this case, such an inclined facet can be easily provided by etching or the like used in a semiconductor process, as compared with the optical polishing. Note that damages to the optical waveguide device can be reduced in handling it more significantly when a light-exiting portion of the optical waveguide is concave than when it is convex.

When the first surface of the substrate on which the optical waveguide is provided contact the submount, a propagation loss in the optical waveguide is significantly increased. A cladding layer is preferably provided on the first surface of the optical waveguide. In this case, when the cladding layer is provided on the groove of the substrate, the reflectance of the groove may be decreased depending on the refractive index of the substrate. The cladding layer is preferably provided on the first surface of the substrate excluding the groove.

When the cladding layer is provided on the first surface of the substrate, the side of the groove (the inclined facet of the optical waveguide) can have a total reflection property if a relationship given by:

$$\sin(\theta) > n_1/n_2$$

is satisfied where $n_1$ is the refractive index of the cladding layer; $n_2$ is the effective refractive index of the optical waveguide with respect to light guided in the optical waveguide and $\theta$ is the angle attained from intersection of the first surface of the substrate and a normal line to the side (inclined facet) of the groove.

Further, when a relationship given by:

$$t_2 < t < t_1$$

is satisfied where $t_1$ is the depth of a guide mode of the fundamental wave guided in the optical waveguide; $t_2$ is the depth of a guide mode of the second harmonic wave guided in the optical waveguide; and t is the depth of the groove, the second harmonic wave is totally reflected off the groove while the fundamental wave passes through the groove, so that the harmonic wave and the fundamental wave can be separated. Thereby, an amount of the fundamental wave mixed in an amount of the harmonic wave is reduced. Further, the separated fundamental wave is detected so that an output characteristic of the fundamental wave can be monitored.

When a relationship given by:

$$nc_2/nf_2 < \sin(\theta) < nc_1/nf_1$$

is satisfied where $nc_1$ is the refractive index of the cladding layer with respect to the fundamental wave; $nc_2$ is the refractive index of the cladding layer with respect to the second harmonic wave; $nf_1$ is the refractive index of the optical waveguide with respect to the fundamental wave; $nf_2$ is the refractive index of the optical waveguide with respect to the second harmonic wave; and $\theta$ is the angle attained from intersection of the first surface of the substrate and a normal line to the side of the groove, if the thickness of the cladding layer is appropriate, only the harmonic wave is totally reflected off the groove, thereby allowing wavelength separation. Therefore, an amount of the fundamental wave mixed in the harmonic wave can be reduced. Further, an output characteristic of the fundamental wave can be monitored by detecting the separated fundamental wave.

Further, when light is output through the second surface of the substrate opposite the first surface, a diffraction grating may be provided on the second surface so that the number of parts can be reduced.

When light is output through the second surface of the substrate included in the optical waveguide device, light reflected off the inclined facet is propagated in the substrate as a divergence beam, having various directional components. When the substrate is made of a birefringence optical crystal, the refractive index thereof with respect to ordinary light is different from the refractive index thereof with respect to extraordinary light. Therefore, light beams transmitted from the optical waveguide device has different phases between in a direction parallel to the optical waveguide and a direction substantially perpendicular that direction. This causes the wavefront of collimated light beams has astigmatism components. Therefore, a second birefringence optical crystal whose optical axis is orthogonal to that of a birefringence optical crystal included in the substrate is preferably provided in a divergence optical path of the transmitted light from the optical waveguide device so as to compensate for an astigmatism component.

Alternatively, the substrate surface (second surface) through which light is transmitted from the optical waveguide device may be substantially in the shape of a cylinder, thereby compensating for the astigmatism.

A cylindrical lens may be provided in the optical path of the transmitted light from the optical waveguide device, thereby compensating for the astigmatism.

In the coherent light source of the present invention, when the optical waveguide device and the semiconductor laser are provided in a concave package, the concave package may be sealed using the second birefringence crystal as a sealing plate, thereby reducing the number of parts and therefore reducing cost. The sealing plate may be the above-described cylindrical lens.

The distance between the light-exiting facet of the semiconductor laser and the light-incoming facet of the optical waveguide is about several micrometers (e.g., 0 $\mu$m or more and 10 $\mu$m or less) so that a direct coupling is performed without a coupling lens. In this case, returning light from the light-incoming facet is prevented, thereby reducing noise.

In the SHG element, the wavelength of light incident to the SHG element needs to be coincident with the phase matching wavelength of the SHG element. Therefore, using a tunable semiconductor laser, the oscillation wavelength of the semiconductor laser can be fixed in the phase matching wavelength intensity range of an optical waveguide type wavelength conversion device. Such a function can be integrated with a coherent light source, thereby downsizing and stabilizing the coherent light source.

In the integrated unit of the present invention, the coherent light source in which light is output through the second surface opposite the first surface on which the optical waveguide is provided, and the photodetectors are provided on the same surface of the submount. Thereby, the photodetectors can be integrated with the submount in the vicinity of the second surface through which light is output. Moreover, the photodetectors and the coherent light source can be easily and precisely aligned with each other, thereby efficiently assembling the integrated unit.

A light shielding member may be provided between the coherent light source and the photodetectors so that stray light is prevented from reaching the photodetectors. The height of the surfaces of the photodetectors may be higher than the surface on the light-exiting side of the coherent light source with reference to the surface of the submount. Alternatively, a concave portion may be provided in the submount surface so that the coherent light source is provided in the concave portion.

In the integrated unit of the present invention, the coherent light source, in which light is output through the first surface of the substrate on which the optical waveguide is provided, is provided on a first surface of the submount, while the photodetectors are provided on a second surface of the submount. Thereby, the stray light is prevented from reaching the photodetectors, without the above-described light shielding member or groove.

Further, when the integrated unit or the coherent light source is provided in the concave package, a diffraction element is used to obtain a stable optical system of an optical pickup. The concave package may be sealed with a transparent plate on which a diffraction grating is provided. Thereby, the number of parts can be reduced.

Using the integrated unit of the present invention, a small and thin optical pickup of the present invention can be achieved. A diffraction grating may be provided in the focusing optical system, a substrate surface of the optical waveguide device, or the transparent plate sealing the concave package. Thereby, the number of parts can be reduced. The transmitted light is split into three light beams of 0th order and ±1st orders by the diffraction grating. The 0th order light beam is applied to a target track on an optical disk. The reflected light from the optical disk is incident to the focusing photodetectors which in turn detects an RF signal. The ±1st order light is used as subbeams for detecting tracking error signals, and the subbeams are detected by the respective tracking photodetectors, thereby obtaining the tracking error signals from differential output signals of the subbeams.

Further, the photodetectors may be provided on opposite sides of the coherent light source. Each photodetector is divided into a central portion and a peripheral portion (focusing photodetectors). In addition, the focusing optical system and a second diffraction element (hologram) having lens action may be provided. In this case, when the light reflected off an optical disk is diffracted by the second diffraction element, a light spot before focus is created on one of the focusing photodetector while a light spot after focus is created on the other of the focusing photodetectors. Therefore, signal detection can be performed using a spot size detection (SSD) technique.

Thus, the invention described herein makes possible the advantages of providing an optical waveguide device, a coherent light source, an integrated unit, and an optical pickup device which are small and thin and in which returning light to a semiconductor laser and interference noise are prevented.

These and other advantages of the present invention will become apparent to those skilled in the art upon reading and understanding the following description with reference to the accompanying figures.

BRIEF DESCRIPTION OF THE DRAWINGS

FIG. 5 is a cross-sectional view schematically showing a structure of an optical waveguide device, in which a facet of the optical waveguide device is inclined with respect to an optical waveguide, according to Example 2 of the present invention.

FIG. 6 is a cross-sectional view schematically showing a method of performing wavelength conversion using a coherent light source including an optical waveguide device, in which a facet of the optical waveguide device is inclined with respect to an optical waveguide, and a tunable DBR semiconductor laser, in Example 2.

FIG. 9B is a cross-sectional view schematically showing a structure of the optical waveguide device of Example 3 in which a groove is provided in an optical waveguide and a cladding layer having a high refractive index is provided.

FIG. 9C is a cross-sectional view schematically showing a structure of the optical waveguide device of Example 3, used for explaining an appropriate relationship between the groove and the optical waveguide device.

FIG. 9D is a cross-sectional view schematically showing a structure of another optical waveguide device of Example 3 in which a groove is provided in an optical waveguide.

DESCRIPTION OF THE PREFERRED EMBODIMENTS

Figure 1A:
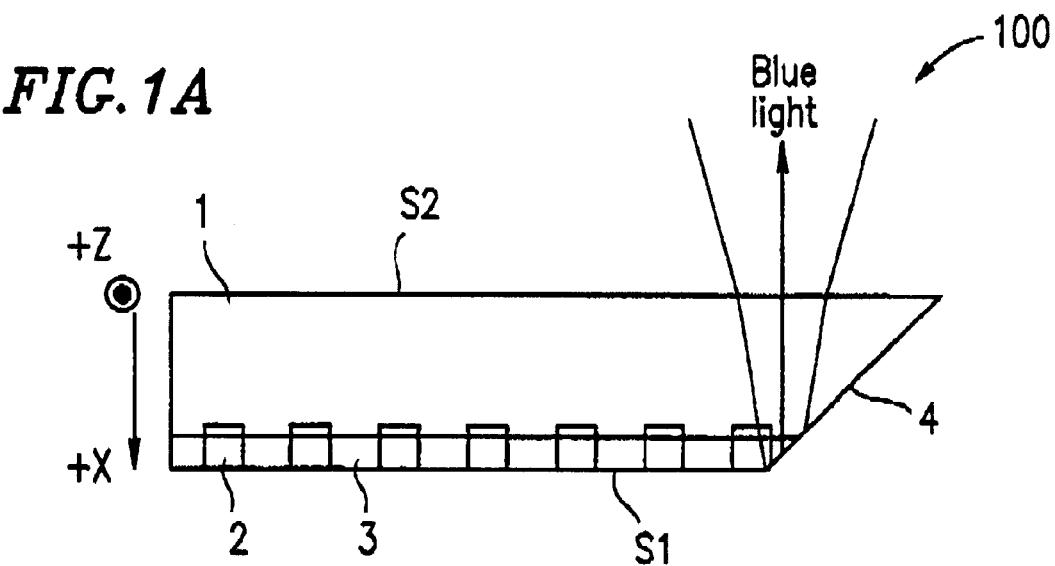
FIG. 1A is a cross-sectional view schematically showing a structure of an optical waveguide device according to Example 1 of the present invention in which a facet of the optical waveguide device is inclined with respect to an optical waveguide.

Conventional optical waveguide devices output light through a facet of an optical guide. For this reason, a coherent light source module including the conventional optical waveguide device and semiconductor laser poses the following problems.

1) The size of the module is a constraint on downsizing an optical pickup.
2) Light reflected off the light-exiting facet of the optical waveguide device is returned to the semiconductor laser, whereby noise characteristics are impaired.
3) The output light varies due to interference with an external confocal surface.

To solve the above-described problems, in the Examples of the present invention, an inclined plane which is inclined with respect to the optical waveguide is provided. Guided light in the optical waveguide is totally reflected off the inclined plane, and the guided light is output through a surface of a substrate. In the Examples, a first surface of the substrate on which the optical waveguide is provided is indicated by reference numeral S1, and a substrate surface opposite to the first surface is indicated by reference numeral S2.

Hereinafter, the present invention will be described by way of illustrative examples with reference to the accompanying drawings. In particular, an example of an optical waveguide device is a second harmonic generation (SHG) device of a quasi phase matching (QPM) method in which a periodic polarization inversion region and an optical waveguide are provided on a substrate of nonlinear optical crystal. An example of a coherent light source is an SHG blue laser including an near-infrared AlGaAs semiconductor laser and a QPM-SHG device. The SHG blue laser is a promising light source for high-density optical disks. There are the above-described problems with the SHG blue laser.

EXAMPLE 1

In Example 1, an optical waveguide device has a facet through which light enters an optical waveguide (hereinafter referred to as a light-incoming facet) and another facet which is inclined with respect to the optical waveguide. A guided light in the optical waveguide is totally reflected off the inclined facet so that the guided light is output through a surface S2 of a substrate opposite a surface S1 thereof on which the optical waveguide is provided.

FIG. 1A is a perspective view schematically showing a structure of a QPM-SHG optical waveguide device 100 according to Example 1 of the present invention. The QPM-SHG optical waveguide device 100 includes a periodic polarization inversion region 2 and a proton exchange waveguide 3 which are provided on an Mg-doped LiNbO$_3$ substrate 1. A facet 4 is provided on a side of the optical waveguide 3 opposite a light-incoming side. The facet 4 is inclined with respect to the optical waveguide 3.

In FIG. 1A, a direction from above to below is defined as an X axis. A direction from the light-incoming facet to inclined facet of the optical waveguide device is defined as a Y axis. A direction away from the plane of the figure and substantially perpendicular to the X and Y axes is defined as a Z axis. Such coordinate axes are used throughout the present specification.

The optical waveguide device 100 is fabricated in the following way. An Mg-doped LiNbO$_3$ substrate 1 having a thickness of about 0.5 mm whose upper and lower sides have been optically polished is prepared. An comb-like electrode and a parallel electrode of Ta are provided on the +X surface (S1) of the substrate 1 by patterning. The pitch of the comb-like electrode is about 3.2 μm. Such a setting allows quasi phase matching with respect to light having a wavelength of about 850 nm. A back electrode of Ta is provided by deposition on the entire −X surface (S2) of the substrate 1. An electric field is applied between the comb-like electrode and the parallel electrode and between the comb-like electrode and the back electrode, so that the periodic polarization inversion region 2 is provided (two-dimensional electric field application technique). The above-described electrodes are all removed, followed by formation of a stripe electrode of Ta having a thickness of about 5 μm in a direction substantially perpendicular to the periodic polarization inversion region 2. The substrate is immersed in pyrophosphoric acid so that proton exchange is conducted. After the proton exchange, the substrate is annealed. In this way, the QPM-SHG optical waveguide device is fabricated. Facets of the resultant QPM-SHG optical waveguide device are optically polished. The light-incoming facet is polished so that the facet is substantially perpendicular to the optical wavelength 3. The facet 4 is optically polished at an angle of about 45° with respect to the optical waveguide 3 (i.e., with respect to the Y axis). In polishing the facet 4, the QPM-SHG optical waveguide device is fixed to a polishing jig at an angle of about 45° and typical optical polishing is performed. After polishing, an antireflection coating is provided on the polished facet 4. An antireflection coating is provided on the light-incoming facet. The reflectance of the antireflection coating with respect to fundamental wave having a wavelength of about 850 nm is 0.03%. On the other hand, the refractive index of the Mg-doped LiNbO$_3$ substrate 1 is about 2.2. Therefore, total reflection occurs at the facet 4 (inclined surface). No coating is provided on the facet 4. On both surfaces of the substrate 1 (i.e., the +X surface (S1) and the −X surface (S2), antireflection coatings are provided so as not to reflect blue light (425 nm) obtained by wavelength conversion.

Figure 2:
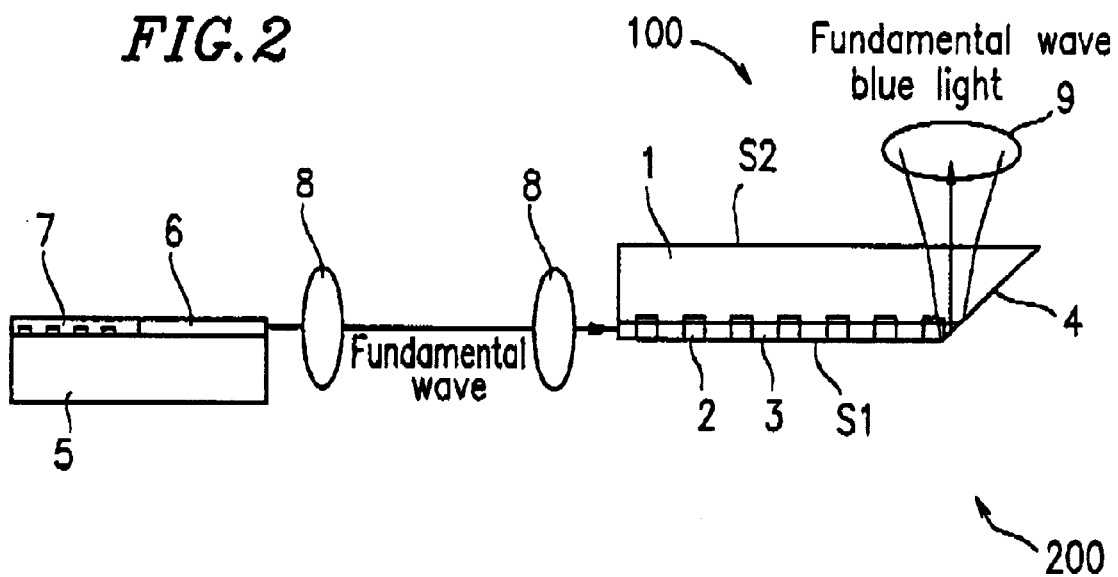
FIG. 2 is a cross-sectional view schematically showing a method of performing wavelength conversion using a coherent light source including an optical waveguide device, in which a facet of the optical waveguide device is inclined with respect to an optical waveguide, and a tunable DBR semiconductor laser, in Example 1.

A coherent light source 200 as shown in FIG. 2 is constructed using the thus obtained QPM-SHG waveguide device 100. The characteristics of the coherent light source 200 are evaluated. A fundamental wave is generated by an AlGaAs tunable DBR semiconductor laser 5 (wavelength: 850 nm). The AlGaAs tunable DBR semiconductor laser 5 includes two electrodes which are an active region 6 and a DBR region 7. The oscillation wavelength of the laser 5 can be adjusted by changing the amount of current injected to the DBR region 7. Lenses 8 are used for optical coupling. When the semiconductor laser emits about 100 mW light, about 45 mW light is obtained through the surface S2 of the substrate 1. When it is assumed that a loss over the optical waveguide is about 1 dB and a loss due to reflection at the surfaces of the substrate 1 is about 10%, about 60 mW laser light is coupled with the optical waveguide. The reflection loss occurs due to the antireflection coating to 425 nm. For comparison, a sample of optical waveguide device is prepared whose light-exiting facet is vertical. In this sample, about 45 mW laser light is obtained through the light-exiting facet.

In the conventional sample optical waveguide device whose light-exiting facet is vertical, part of light reflected off the light-exiting facet is returned to the semiconductor laser. For this reason, an antireflection coating to about 850 nm needs to be provided on the light-exiting facet. Nevertheless, the multi-longitudinal mode occurs in varying wavelength, even though the proportion of returning light is as less as 0.05%. To prevent the multi-longitudinal mode, the reflectances of the light-incoming and light-exiting facets each need to be about 0.02% or less. Such specifications are difficult to satisfy. In contrast, substantially no returning of light occurs from the facet 4, since the facet 4 is inclined at an angle of about 45° with respect to the optical waveguide 3 and the laser light is totally reflected. Only returning light from the light-incoming facet needs to be taken into account. The tolerable reflectance range of the antireflection coating can be increased. Therefore, in the optical waveguide device of Example 1, since substantially no returning of light from the facet 4 occurs, satisfactory tuning characteristics are obtained even when the reflectance of the antireflection coating on the light-incoming facet is as great as 0.03%.

The oscillation wavelength of the tunable DBR semiconductor laser 5 is adjusted into the phase matching wavelength of the QPM-SHG optical waveguide device 100 so that blue light (wavelength: 425 nm) can be generated. The blue light is totally reflected by the facet 4 and 10 mW of blue light can be obtained through the surface S2. In the QPM-SHG optical waveguide device 100, the fundamental wave in a guide mode and the harmonic wave in the guide mode quasi-phase match each other. Therefore, the blue light is propagated in the guide mode in waveguide and then totally reflected off the inclined facet 4 to be output toward the surface S2 of the substrate 1 in a TEM00 mode. In Example 1, an antireflection coating is provided on the surface S2 of the substrate 1 to reflect harmonic wave, i.e., blue light (wavelength: 425 nm) so that the blue light can be efficiently output through the surface S2.

The blue light thus output through the surface S2 is collimated by the collimator lens 9. The collimated light is then converged by an objective lens. As for the convergence property of the blue light, spherical aberration occurs if the blue light passes through a typical collimator lens, since the blue light is totally reflected by the facet 4 and then transmitted through the Mg-doped LiNbO$_3$ substrate 1. In Example 1, the collimator lens 9 is therefore designed to minimize such aberration of the blue light which has been transmitted through the 0.5 mm-thick Mg-doped LiNbO$_3$ substrate 1. The numerical aperture (NA) of the collimator lens 9 is about 0.06. The NA of the objective lens is about 0.6. The full width at maximum of the converged blue light is about 0.4 μm, which is substantially the diffraction limit.

In the optical waveguide device of Example 1, the thickness of the Mg-doped LiNbO$_3$ substrate 1 on which the QPM-SHG optical waveguide device is provided is about 0.5 mm. When a substrate is less than about 0.3 mm thick, the substrate is difficult to handle, thereby reducing yield. When a substrate is more than about 1.0 mm thick, light through the substrate causes astigmatism greater than an amount tolerable for an optical disk system. Therefore, the thickness of a substrate is preferably about 0.3 mm or more and about 1.0 mm or less, when a guided light is output through the surface S2 of the substrate opposite the surface S1 thereof on which the optical waveguide 3 is provided.

In Example 1, the facet is inclined at an angle of about 45° with respect to the optical waveguide 3. When the facet is inclined at an angle other than 45° with respect to the optical waveguide 3, coma aberration occurs in the spot of focusing light. To suppress such aberration into an tolerable level for an optical disk system, the facet needs to be inclined at an angle of about 45±1° with respect to the optical waveguide 3.

The optical waveguide device 100 of Example 1 is a QPM-SHG optical waveguide device of a wavelength conversion type. Therefore, a harmonic wave caused by wavelength conversion has a guide mode. In the case of Cerenkov light having a radiation mode, the light is also reflected off the surfaces S1 and S2 of the substrate 1 when the substrate 1 is thin. For this reason, a certain thickness is required for the substrate 1 in order to cause light to be totally reflected off the inclined facet 4. In Example 1, since the harmonic wave is obtained in the guide mode, the substrate can be thin. Further, the occurrence of the astigmatism can be suppressed. The inclined facet can be provided in the substrate surface (S1), on which the optical waveguide 3 is provided, by forming a groove having an inclined side. Details will be described in Example 3.

Further, in Example 1, light emitted by the tunable DBR semiconductor laser 5 is coupled with the optical waveguide 3 using the coupling lenses. As described above, the facet 4 is inclined at an angle of about 45° with respect to the optical waveguide 3 so that guided light is totally reflected off the facet 4. Therefore, the facet 4 generates substantially no returning light. Moreover, when an antireflection coating is provided on the light-incoming facet, returning light noise is further suppressed.

In a direct coupling technique in which the coupling lens is not used, the returning light from the light-incoming facet causes substantially no problem. In the direct coupling technique, a distance between the light-exiting facet of the semiconductor laser and the light-incoming facet of the optical waveguide device is several micrometers (i.e., 0 μm or more and 10 μm or less).

Figure 3:
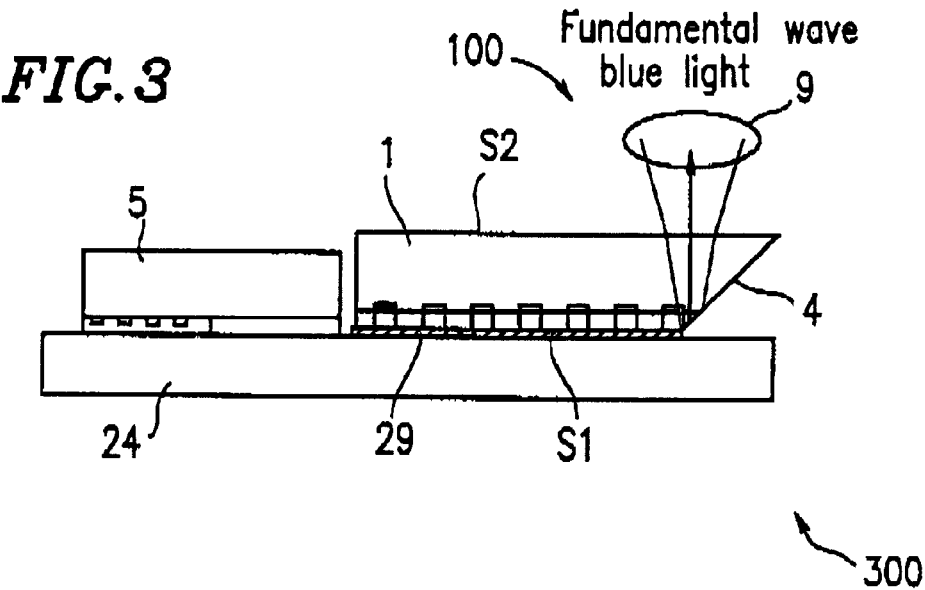
FIG. 3 is a cross-sectional view schematically showing a structure of a coherent light source (SHG blue laser) including an optical waveguide device, in which a facet of the optical waveguide device is inclined with respect to an optical waveguide, and a tunable DBR semiconductor laser, in Example 1.

FIG. 3 shows a configuration of a coherent light source 300 (SHG blue laser) of the direct coupling type according to Example 1. The coherent light source 300 includes the tunable DBR semiconductor laser 5 and the QPM-SHG optical waveguide device 100 which are provided on a submount 24 in such a manner that the active region 6 and the optical waveguide 3 contact a submount 24. Electrodes (not shown) are separately provided on the submount 24 so as to inject current to the active region 6 and the DBR region 7. A distance between the light-exiting facet of the semiconductor laser 5 and the light-incoming facet of the optical waveguide 3 is set to about 3 μm for light coupling. Adjustment in the thickness direction is carried out by changing the thickness of a cladding layer 29 formed on the optical waveguide 3. In this case, a light coupling efficiency is substantially equal to that of when light is coupled using the lenses. In such a direct coupling module, since the distance between the light-exiting facet of the semiconductor laser 5 and the light-incoming facet of the optical waveguide 3 is small, light reflected off the light-incoming facet of the optical waveguide 3 does not cause returning light noise. The facet 4 is inclined at an angle of about 45° so that the laser light passing through the optical waveguide 3 is totally reflected off the facet 4. Therefore, substantially no returning light from the facet 4 to the semiconductor laser occurs. As a result, the laser light guided in the optical waveguide 3 is wavelength converted into a blue light. The blue light can be output in the TEM00 mode through the surface (S2) of the substrate 1. Thus, the direct coupling type module is very practical.

Further, in Example 1, the semiconductor laser is of the tuning type. Therefore, a stable harmonic wave can be obtained when the optical waveguide device 100 is of the wavelength conversion type. A reflection grating or a bandpass filter allows a tuning capability. In Example 1, the tuning capability is integrated with the semiconductor laser (tunable DBR semiconductor laser) so that the module can be downsized. Therefore, such a module may contribute to the downsizing of application devices such as optical disk recording and reproduction apparatus, laser printers, or the like.

Figure 4:
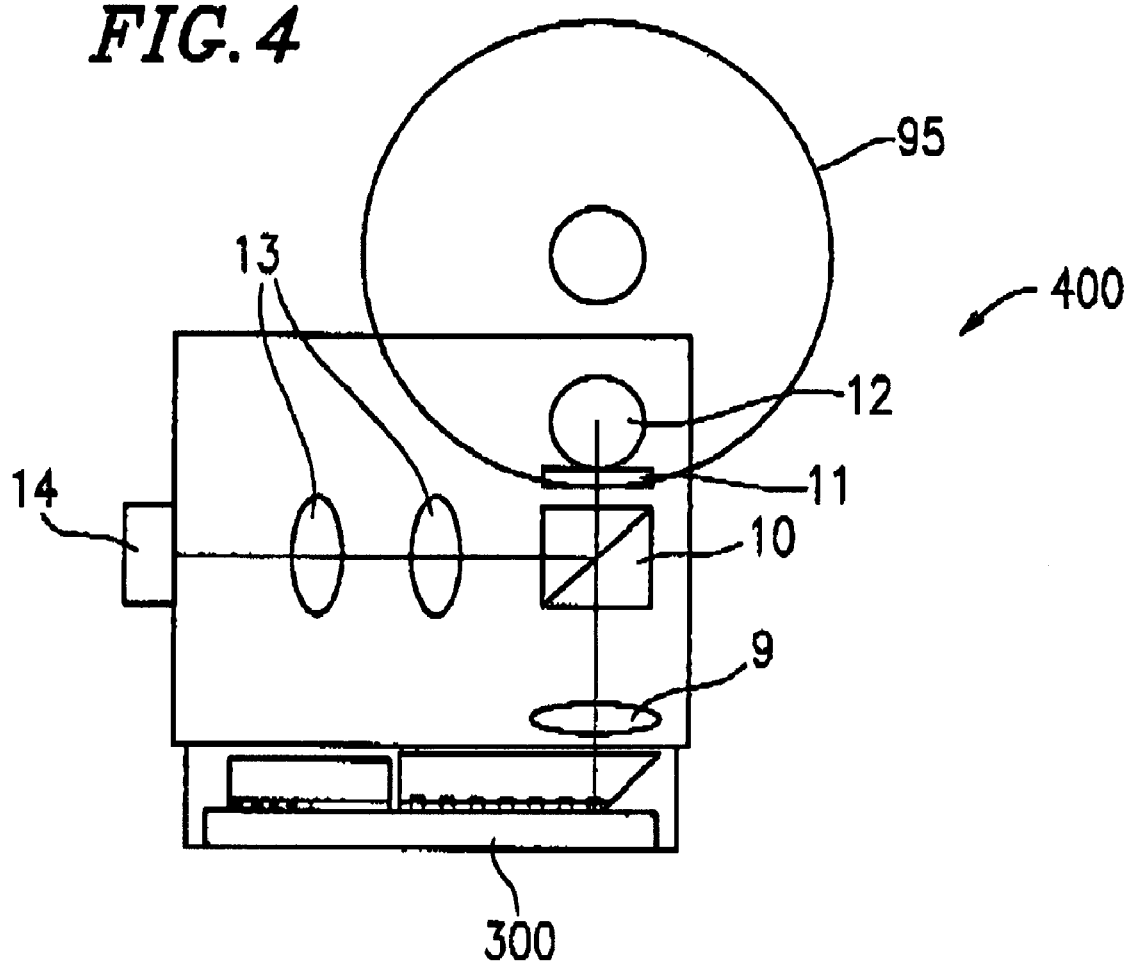
FIG. 4 is a diagram schematically showing a structure of an optical pickup including the SHG blue laser of Example 1.

FIG. 4 is a diagram schematically showing a structure of an optical pickup 400 according to Example 1 of the present invention. The optical pickup 400 includes the coherent light source of the direct coupling type shown in FIG. 3. In the optical pickup 400, blue light output through the surface S2 of the substrate 1 of the optical waveguide device 100 is collimated by the collimator lens 9. The collimated light is transmitted through a polarizing beam splitter 10 (PBS) and a quarter-wave plate 11. Thereafter, the blue light is reflected by a raising mirror (not shown) and converged by an objective lens 12 onto an optical disk 95. The light is reflected by the optical disk 95 and transmitted through the same optical path. The light is then bent into an angle of 90° by the PBS 10 and guided into a photodetector 14 (PD) by a detection lens system 13 including a detection lens and a cylindrical lens. The photodetector 14 extracts a servo signal and a reproduction signal from the light. The coherent light source of Example 1 using the optical waveguide device 100 can emit blue light in a direction substantially perpendicular to the optical axis of the module. Therefore, the optical pickup 400 of Example 1 is compact compared with the conventional structure.

In the optical pickup 400 of Example 1, substantially no variation in the reflected light (reproduced signal) is observed at the PD 14. In Example 1, the facet 4 is inclined with respect to the optical waveguide 3. Therefore, substantially no reflected light from the facet 4 is guided onto the optical disk 95. However, when a disk-tilt state and an out-of-focus state simultaneously occur, the reflected light from the optical disk surface is returned to a position shifted slightly from the facet 4. The shifted light is reflected off the surface S1 of the substrate 1 included in the QPM-SHG optical waveguide device 100. Such reflected light interferes with light emitted from the optical waveguide 3. To avoid this, in Example 1, antireflection coating (non-reflection portion) against second harmonic wave, i.e., the blue light (wavelength: 425 nm), is provided on the surface S1 of the substrate 1. For example, when the antireflection coating has a reflectance of about 0.1%, the interference can be reduced to about 1% or less.

Figure 1B:
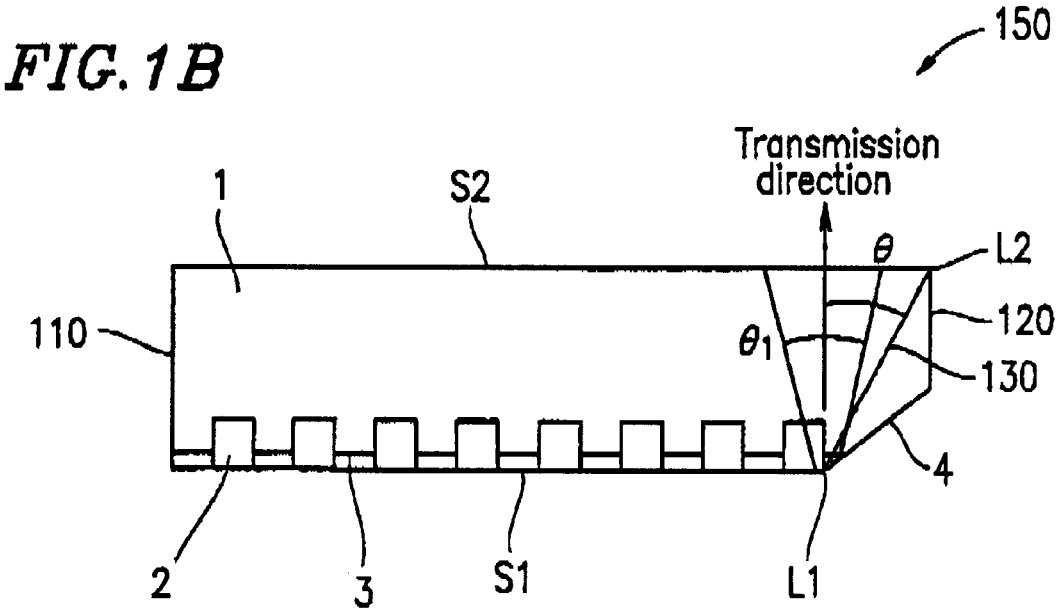
FIG. 1B is a cross-sectional view schematically showing a structure of an optical waveguide device which is a variant of Example 1, in which a portion of a facet of the optical waveguide device is inclined with respect to an optical waveguide.

FIG. 1B is a cross-sectional view schematically showing a structure of a QPM-SHG optical waveguide device 150 which is a variant of Example 1. Whereas the entire facet of the substrate 1 in the optical waveguide device 100 shown in FIG. 1A is inclined, the inclined surface is provided on part of the facet of the substrate 1 in the optical waveguide device 150 shown in FIG. 1B.

In the optical waveguide device 150, a facet 120 opposite a light-incoming facet 110 of the optical waveguide 3 is inclined with respect to the optical waveguide 3 (inclined surface 4). Guided light in the optical waveguide 3 is totally reflected by the inclined surface 4, and the reflected light is transmitted through the substrate surface S2.

In this case, the periodic polarization inversion region 2 and the proton exchange waveguide 3 are provided on the Mg-dopes LiNbO$_3$ substrate 1. The surface 4 inclined with respect to the waveghide 3 (Y direction) is provided in the facet 120 of the optical waveguide 3. Harmonic wave obtained by wavelength conversion is propagated in the optical waveguide 3, totally reflected off the inclined surface 4, and transmitted through the substrate surface S2.

Referring to FIG. 1B, the inclined surface 4 and the substrate surface S1 intersects at a line L1. The facet 120 and the substrate surface S2 intersect at a line L2. A plane including the lines L1 and L2 is indicated by reference numeral 130. An angle θ is attained from intersection of the plane 130 and a direction in which a harmonic wave is transmitted through the substrate surface S2. In Example 1, the inclined surface 4 and the substrate surface S1 attain a 45° angle. When the harmonic wave totally reflected off the inclined surface 4 is transmitted through the substrate surface S2, the harmonic wave collides with the facet 120 if the angle θ is well less than half a divergence angle $θ_1$ of the harmonic wave. Specifically, the divergence angle $θ_1$ of FIG. 1B and the angle θ which the plane 130 and the transmission direction attain needs to satisfy the following relationship:

$$θ_1/2 < θ$$

in order to prevent the harmonic wave from colliding with the facet 120 and to output satisfactory harmonic wave. The divergence angle $θ_1$ is preferably in a range in which the intensity of harmonic wave is about $1/e^2$ or less with respect to the peak intensity.

EXAMPLE 2

In Example 2, an optical waveguide device has a light-incoming facet and another facet which is inclined with respect to the optical waveguide. A guided light in the optical waveguide is totally reflected off the inclined facet so that the guided light is output through a surface S1 of a substrate on which the optical waveguide is provided.

FIG. 5 is a perspective view schematically showing a structure of a QPM-SHG optical waveguide device 500 according to Example 2 of the present invention. The QPM-SHG optical waveguide device 500 includes a periodic polarization inversion region 16 and a proton exchange waveguide 17 which are provided on a surface S1 of an Mg-doped LiNbO$_3$ substrate 15. A facet 18 is provided on a side of the optical waveguide 3 opposite a light-incoming side. The facet 18 is inclined with respect to the optical waveguide 3.

The optical waveguide device 500 is fabricated in the following way. An Mg-doped LiNbO$_3$ substrate 15 having a thickness of about 0.5 mm whose upper and lower sides have been optically polished is prepared. The periodic polarization inversion region 16 and the proton exchange optical waveguide region 17 are formed on a +X surface (S1) of the substrate 15 in a way similar to that of Example 1. The light-incoming facet is vertically polished. The facet 18 is optically polished at an angle of about 45° with respect to the optical waveguide 17. In the optical waveguide device 100 of Example 1, the facet 4 is polished in such a manner that the apex of the facet 4 having a 45° angle is created at the surface S2 side. On the other hand, in Example 2, the 45° angle apex of the facet 18 is created on the surface S1 side. In polishing the facet 18, the QPM-SHG optical waveguide device 500 of Example 2 is fixed to a polishing jig at an angle of about 45° and typical optical polishing is performed. After the polishing, an antireflection coating is provided on a light-incoming facet. An antireflection coating is also provided on the light-incoming facet. The reflectance property of the antireflection coating provided on the light-incoming facet is about 0.02% with respect to fundamental wave having a wavelength of about 850 nm. The refractive index of the Mg-doped LiNbO$_3$ substrate 15 is about 2.2. Therefore, total reflection occurs at the facet 18 (inclined surface). No coating is provided on the facet 18. On the surface S1 of the substrate 15, an antireflection coating is provided as a non-reflection portion so as not to reflect fundamental wave (wavelength: 850 nm). In Example 2, when the antireflection coating against the fundamental wave is not provided, light reaches the substrate surface S1 immediately after being totally reflected off the facet 18 and is therefore reflected off the substrate surface S1 to propagate the optical waveguide 17 again. Such returning light causes a vertical mode to be deteriorated in the semiconductor laser, when the laser light is used as fundamental wave.

A coherent light source 600 as shown in FIG. 6 is constructed using the thus obtained waveguide QPM-SHG device 500. The coherent light source 600 includes an AlGaAs tunable DBR semiconductor laser 19 which is coupled with the QPM-SHG optical waveguide device 500 using lenses 22. Light emitted from the semiconductor laser 19 is used as fundamental wave. Characteristics of such a coherent light source are evaluated as follows. When the semiconductor laser 19 emits about 100 mW light, about 45 mW light is obtained through the substrate surface S1. When it is assumed that a loss over the optical waveguide is about 1 dB and a loss due to reflectance at the substrate surface S1 is about 10%, laser light of about 60 mW is coupled with the optical waveguide 17. The reflectance loss occurs due to the antireflection coating to 425 nm.

In Example 2, as in the conventional sample optical waveguide device whose light-exiting facet is vertical, light reflected from the substrate surface S1 is returned to the semiconductor laser. For this reason, the antireflection coating to light having a wavelength of about 850 nm is also provided on the substrate surface S1. The reflectance of the antireflection coating is set to about 0.02%. Therefore, the total reflectance of both of the surfaces can be reduced to about 0.05% or less, thereby obtaining a satisfactory tuning property.

The oscillation wavelength of the tunable DBR semiconductor laser 19 is adjusted so that the oscillation wavelength is coincident with the phase matching wavelength of the QPM-SHG optical waveguide device 500. Thereby, blue light can be generated. The blue light is totally reflected by the facet 18 and 10 mW of blue light can be obtained through the substrate surface S1. In the QPM-SHG optical waveguide device 500, the fundamental wave in a guide mode and the harmonic wave in the guide mode quasi-phase match each other. Therefore, the blue light is propagated in the guide mode in waveguide 17 and then totally reflected off the inclined facet 18 to be output through the substrate surface S1. In Example 2, the antireflection coating is provided on the substrate surface S1 to reflect harmonic wave, i.e., blue light (wavelength: 425 nm) so that the blue light can be efficiently output through the substrate surface S1.

The blue light thus output through the substrate surface S1 is collimated by a collimator lens 23. The collimated light is then converged by an objective lens. As for the convergence property of the blue light, in Example 1, spherical aberration varies depending on the thickness of the substrate 1 through which the blue light is transmitted in the thickness direction. Therefore, in Example 1, the thickness of the substrate 1 needs to be adjusted. On the other hand, in Example 2, the blue light is transmitted through the substrate surface S1. Therefore, the blue light can be collimated without aberration by designing the collimator lens 23 in advance without taking into account the thickness of the substrate 15.

In Example 2, the reflected light from the facet 18 is substantially not transmitted through the substrate 15, so that substantially no astigmatism occurs in the spot of converged light, unlike the optical waveguide device 100 of Example 1. However, when the light is shifted with respect to optical components such as collimator lens 23 which may be mechanically aligned, aberration occurs due to such a collimator lens. To suppress such aberration to an tolerable level for an optical disk system, the facet needs to be inclined at an angle of about 45±1° with respect to the optical waveguide.

For the configuration of Example 2 in which light is transmitted from the substrate surface S1, a harmonic wave caused by wavelength conversion preferably has a guide mode. In the case of a radiation mode rather than the guide mode, the light is radiated in a direction substantially perpendicular to the substrate surfaces. The thickness of the substrate 15 needs to be increased. The light is also reflected off the substrate surface S2. Light in the radiation mode is difficult to be converged up to a diffraction limit. Therefore, such light substantially cannot be applied to optical disk recording and reproduction devices.

Further, in Example 1, light emitted by the tunable DBR semiconductor laser 19 is coupled with the optical waveguide 17 using the coupling lenses. As described in Example 1, using the direct coupling technique in which the coupling lens is not used and a distance between the light-exiting facet of the semiconductor laser and the light-incoming facet of the optical waveguide device is several micrometers (i.e., 0 µm or more and 10 µm or less), substantially no noise is caused by the returning light from the light-incoming surface.

Figure 7:
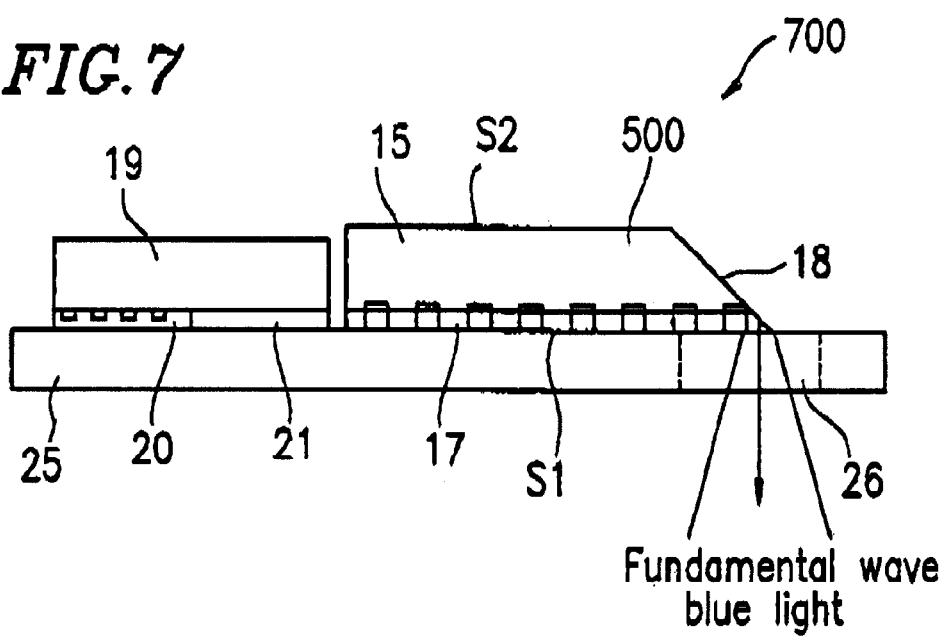
FIG. 7 is a cross-sectional view schematically showing a structure of a coherent light source (SHG blue laser) including an optical waveguide device, in which a facet of the optical waveguide device is inclined with respect to an optical waveguide, and a tunable DBR semiconductor laser, in Example 2.

FIG. 7 shows a configuration of a coherent light source module 700 of the direct coupling type according to Example 2. The light source module includes the tunable DBR semiconductor laser 19 and the QPM-SHG optical waveguide device 500 which are provided on a submount 25 in such a manner that an active region 21 of the semiconductor laser 19 and the optical waveguide 17 of the optical waveguide device 500 contact the submount 25. Electrodes (not shown) are separately provided on the submount 25 so as to inject current to the active region 21 and a DBR region 20. A distance between the light-exiting facet of the semiconductor laser 19 and the light-incoming facet of the optical waveguide 17 is set to about 3 µm for light coupling. Adjustment in the thickness direction is carried out by changing the thickness of a cladding layer (not shown) formed on the optical waveguide 17. In this case, a light coupling efficiency is substantially equal to that when light is coupled using the lenses. In such a direct coupling light source module 700, since the distance between the light-exiting facet of the semiconductor laser 19 and the light-incoming facet of the optical waveguide 17 of the optical waveguide device 500 is small, light reflected off the light-incoming facet of the optical waveguide 17 does not cause returning light noise.

In Example 2, the semiconductor laser light is converted into blue light by wavelength conversion while being guided in the optical waveguide 17, and obtained in the TEM00 mode through the substrate surface S1. When a window 26 is provided on the submount 25, the blue light can be output through the substrate surface S1 also in the direct coupling configuration of Example 2.

Further, in Example 2, the semiconductor laser is of the tuning type. Therefore, a stable harmonic wave can be obtained when the optical waveguide device is of the wavelength conversion type. In Example 2, a tuning capability is integrated with the semiconductor laser (tunable DBR semiconductor laser) so that the module can be downsized. Therefore, such a module may contribute to the downsizing of application devices such as optical disk recording and reproduction devices, laser printers, or the like.

The coherent light source of Example 2 using the optical waveguide device can emit blue light in a direction substantially perpendicular to the optical axis of the module. Therefore, an optical pickup of Example 2 is compact compared with the conventional structure.

In the optical pickup including the coherent light source of Example 2, a variation in the reflected light (reproduced signal) is observed at a PD as in Example 1. Such a variation substantially does not pose a problem upon a typical reproduction operation. When an antireflection coating is provided, a more satisfactory reproduction signal can be obtained. A multi-layer antireflection coating against fundamental wave (wavelength: 850 nm) from the semiconductor laser 19 and second harmonic wave, i.e., the blue light (wavelength: 425 nm), is provided on the substrate surface S1. The antireflection coating has a reflectance of about 0.1% for light having a wavelength of about 850 nm and light having a wavelength of about 425 nm, whereby interference can be reduced to about 1% or less.

EXAMPLE 3

As described above, when an inclined facet having a total reflection angle is provided at an end of an optical waveguide of an optical waveguide device, a guided light is effectively output from the optical waveguide device. Further, when the optical waveguide device is integrated with a semiconductor laser into a light source module, the light source module can be downsized and light emitted from the light source module is stable. Still further, returning light from a facet to the semiconductor laser can be reduced.

However, optical polishing is required for formation of the inclined facet having a total reflection angle at the end of the optical waveguide. This poses a problem with cost reduction when such a device is produced in a large quantity. Therefore, in Example 3, a configuration of an optical waveguide device applicable to a wafer process easily adapted to mass production is proposed.

Figure 8:
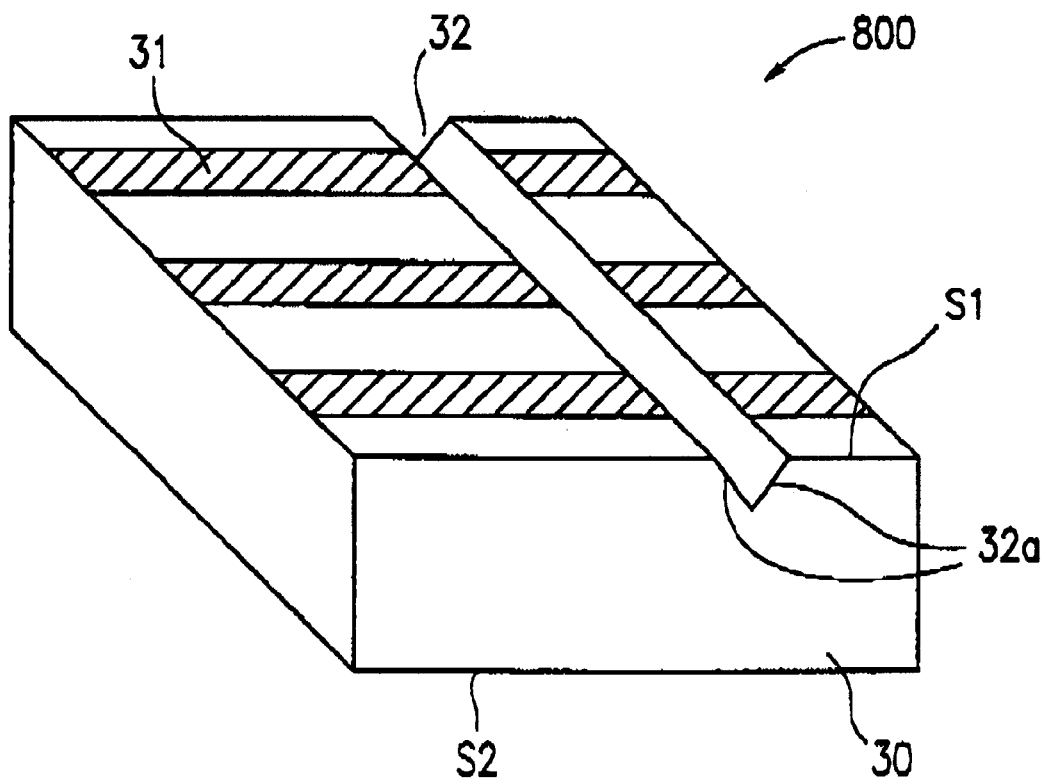
FIG. 8 is a perspective view schematically showing a structure of an optical waveguide device, in which a groove is provided in an optical waveguide, according to Example 3 of the present invention.

FIG. 8 is a perspective view schematically showing a configuration of an optical waveguide device 800 according to Example 3 of the present invention. In the optical waveguide device, an optical waveguide 31 is provided on a substrate 30. A groove 32 is provided in a surface S1 of the substrate 30 on which the optical waveguide 31 is provided. The groove 32 is laid in a stripe form substantially orthogonal to the optical waveguide 31. A side 32a of the groove 32 is inclined at an angle such that guided light is totally reflected off the side 32a. The guided light in the optical waveguide 31 is reflected off the side 32a of the groove 32 and transmitted through an opposite surface S2 of the substrate 30.

Such an optical waveguide device 800 may be fabricated in the following way, for example. To easily allow mass production, the formation of the groove 32 is conducted using an etching process which is typically used in semiconductor process. For example, the groove 32 is formed by an inclined etching technique using an ion beam milling device. An $LiNbO_3$ substrate is used as the substrate 30. In the $LiNbO_3$ substrate, it is easy to form a low-loss waveguide using proton exchange.

An ion beam milling device utilizing reactive gas has a high selectivity and directivity of etching, thereby causing a cross-section of the etched substrate to have a inclined side. In a fabrication process of the groove 32, a Cr film is initially deposited on the substrate 30. A portion of the Cr film under which the groove 32 will be formed is removed using a photolithography technique. The resultant Cr film is used as an etching shielding mask. With such a mask, the substrate is etched by the reactive ion beam milling device using a reactive gas. Thus, the groove 32 is produced. In this case, the substrate 30 is inclined with respect to a direction of an ion beam emitted from the milling device so that an etched side (the side 32a of the groove 32) is inclined with respect to the substrate 30. When $C_3F_8$ is used as the reactive gas, a selectivity ratio of the Cr film to the $LiNbO_3$ substrate 30 can be improved. Therefore, the side 32a of the groove 32 can be inclined at an angle of about 45° with respect to the substrate surface S1. In Example 3, the desired groove 32 can be formed over an entire 3-inch wafer in a single process, thereby allowing mass production of the optical waveguide devices. With such an etching technique, the groove production in the wafer process becomes easy. In addition, the shape, positional precision, depth, and the like of the groove can be accurately adjusted. Therefore, the etching technique is effective in realizing a configuration described below.

Note that the groove 32 may be formed using a dicing technique. In the dicing technique, a blade capable of cut-off polishing is used to form the groove 32. For example, a section close to that obtained by optical polishing can be formed, for example, using a blade having a surface roughness of #6000. The blade having a 45°-angle section is used, and cutting is conducted in the vicinity of the optical waveguide surface at a depth greater than or equal to the thickness of the optical waveguide, for example, about 5 $\mu$m. Thus, the groove 32 capable of total reflection is provided in the optical waveguide. When the dicing technique is used, it is easy to produce the inclined side 32a of the groove 32. However, a sharp blade is required for a precision V-shaped processing. The blade is significantly worn. Therefore, preferably, a 45°-angle mirror surface side 32a is formed, but the bottom shape of the groove 32 may be in any form. Since the optical waveguide 31 is several micrometers from the upper surface of the wafer (optical wavelguide device), the dicing depth of about 10 $\mu$m is sufficient so that a required total reflection angle can be obtained regardless of the shape of the bottom of the groove 32. Thus, when the reflection facet is provided by dicing, the processes such as photolithography or etching are not required, thereby simplifying the fabrication process and shortening the time thereof. Further, the dicing depth is only about 10 $\mu$m, thereby making it easy to perform the mirror surface processing. Therefore, wear in the blade can be minimized and the yield is high in the fabrication process of the optical waveguide devices.

In Example 3, similar to Example 1, when the side of the groove is at an angle other than 45° with respect to the optical waveguide, coma aberration occurs in the spot of focusing light. To suppress such aberration into an allowable amount for an optical disk system, the side of the groove needs to be inclined at an angle of about 45±1° with respect to the optical waveguide.

The above-described configuration is applied to an optical waveguide device having a wavelength conversion capability. An optical waveguide device can be constructed by providing a periodic polarization inversion structure in the optical waveguide. When an Mg-doped $LiNbO_3$ substrate having a high nonlinearity is used, a high efficiency wavelength conversion element can be obtained. For example, infrared light having a wavelength of about 850 nm is applied to the optical waveguide device, blue light having a wavelength of about 425 nm can be emitted from the optical waveguide device. In Example 3, the blue light is output by being reflected off the total reflection facet (inclined facet), instead of the conventional configuration in which the blue light is output through the facet of the optical waveguide. A key point of the configuration of Example 3 is that guided light can be divided into a fundamental wave and a harmonic wave by utilizing the total reflection surface in the optical waveguide.

Figure 9A:
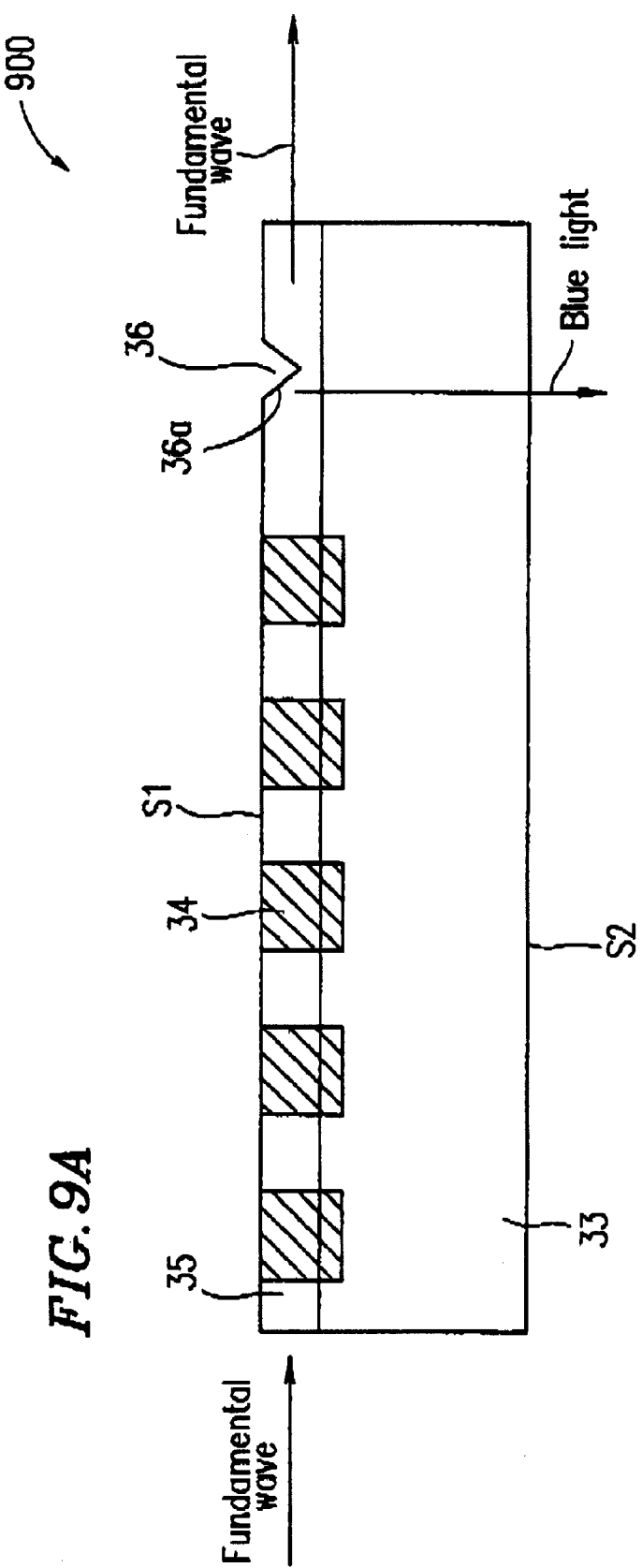
FIG. 9A is a cross-sectional view schematically showing a structure of the optical waveguide device of Example 3 in which a groove is provided in an optical waveguide.

FIG. 9A is a cross-sectional view schematically showing a structure of an optical waveguide device 900 having a wavelength conversion capability of Example 3. In this case, an optical waveguide 35 including a periodic polarization inversion region 34 whose pitch is about 3.2 $\mu$m is provided in the vicinity of a surface of the Mg-doped $LiNbO_3$ substrate 33. A groove 36 is provided in the vicinity of the substrate surface on which the optical waveguide 35 is provided.

In the optical waveguide 35, a fundamental wave propagated as guided light is converted into a harmonic wave propagated as guided light as in Examples 1 and 2. The harmonic wave is totally reflected off a side 36a of the groove 36 so that the harmonic wave can be output through a back surface (S2) of the Mg-doped $LiNbO_3$ substrate 33. Therefore, the harmonic wave propagated in the guide mode can be efficiently output to the outside by the above-described configuration. Further, with the configuration, wavelength separation can be performed using the groove 36 due to a difference in profile between guide modes. The fundamental wave and the harmonic wave which are propagated in the optical waveguide 35 exhibit different electric field distributions depending on the relationship between wavelength and dispersion in refractive index. For example, in the optical waveguide whose proton exchange layer is formed by annealing, the depth of the guide mode of the fundamental wave ($t_1$) is about 2.5–3 μm; and the depth of the guide mode of the second harmonic wave ($t_2$) is about half the extent of the fundamental wave. By utilizing such a property, wavelength separation can be performed by the groove 36 provided in the optical waveguide 35. The shape of the groove 36 formed by etching can be precisely adjusted as described above. In particular, the ion beam milling technique allows high precision and mass production, and therefore can be effectively applied to production of the optical waveguide device 900 of Example 3. For example, when the depth t of the groove 36 is set to $t_2 < t < t_1$, e.g., t≅1.5 μm, the harmonic wave can be output to the outside by being totally reflecting on the groove 36. Meanwhile, most of the fundamental wave is propagated through the groove 36 and continues to be propagated in the optical waveguide 35 as it is. Therefore, the fundamental wave which has passed through the groove 36 can be detected from the outside, so that the output characteristics of the fundamental wave can be monitored. Further, this makes it easy to reduce the output of the fundamental wave which is mixed into the output harmonic wave.

In addition, a cladding layer having a high refractive index may be provided on a surface of the optical waveguide. FIG. 9B shows an optical waveguide device 950 on which a cladding layer 46 having a high refractive index is provided. The cladding layer 46 is obtained by providing on an optical waveguide 35 a cladding layer having a refractive index higher than that of the optical waveguide 35. For example, the optical waveguide 35 is formed on the LiNbO$_3$ substrate by proton exchange and annealing (the annealing causes the refractive index to be close to that of the substrate). Additional proton exchange is performed so that the cladding layer 46 having a high refractive index can be provided. The thickness of the cladding layer 46 is provided so as to satisfy a cut-off condition for a fundamental wave propagated in the optical waveguide 35. The cut-off condition is that as the thickness of the cladding layer 46 is decreased, light is not propagated in the guide mode, but light is propagated in the radiation mode. The satisfaction of the cut-off condition enhances the confinement of the fundamental wave into the optical waveguide 35 while preventing the fundamental wave from being confined in the cladding layer 46. As a result, the fundamental wave is securely confined and propagated in the optical waveguide 35, thereby improving power density. Therefore, conversion efficiency can be improved. Meanwhile, the cladding layer having a high refractive index allows the harmonic wave to be securely confined in the optical waveguide 35. As a result, the depth of the propagation mode of the harmonic wave is reduced to about 80% or less of that when the cladding layer 46 having a high refractive index is not provided. Therefore, the depth of the groove provided in the vicinity of the substrate surface can be smaller. Etching needs to be conducted over a groove depth of about 1 μm or more. In order to provide the 45° angle side on the substrate surface over a depth of about 1 μm or more, a masking material having a high level of selectivity is required. Further, deeper etching leads to occurrence of roughness in the etched surface, whereby the reflectance of the reflectance surface is decreased. This leads to fluctuation of a wavefront of reflected light which causes deterioration of the convergence characteristic of the emitted light. In contrast, when the cladding layer having a high refractive index is applied to the optical waveguide 35, the required depth of the groove can be reduced by about 20%. Therefore, etching characteristics can be improved, and the roughness of the side of the groove can be significantly reduced.

A preferable optical waveguide device of Example 3 will be described with reference to FIG. 9C. FIG. 9C is a cross-sectional view schematically showing a configuration of an optical waveguide device 970 according to Example 3 of the present invention. In the optical waveguide device 970, an optical waveguide 35 is provided on an Mg-doped LiNbO$_3$ substrate 33. A groove 36 is provided in a surface S1 of the substrate 33 on which the optical waveguide 35 and a periodic polarization inversion region 34 are provided. The groove 36 is laid in a stripe form substantially orthogonal to the optical waveguide 35. A side 36a of the groove 36 is inclined at an angle such that guided light is totally reflected off the side 36a. The guided light in the optical waveguide 35 is reflected off the side 36a of the groove 36 and transmitted through an opposite surface S2 of the substrate 33.

Referring to FIG. 9C, the inclined side 36a and the substrate surface S1 intersects at a line L1. A facet 920 of the substrate 33 and the substrate surface S2 intersect at a line L2. A plane including the lines L1 and L2 is indicated by reference numeral 930. An angle θ is attained from intersection of the plane 930 and the direction in which a harmonic wave is transmitted through the substrate surface S2. In the optical waveguide device 970, the inclined side 36a and the substrate surface S1 attain a 45° angle. When the harmonic wave totally reflected off the inclined surface 36a is transmitted through the substrate surface S2, the harmonic wave collides with the facet 920 if the angle θ is less than with respect to half a divergence angle $θ_1$ of the harmonic wave. Specifically, the divergence angle $θ_1$ of FIG. 9C and the angle θ which the plane 930 and the transmission direction needs to satisfy the following relationship:

$$θ_1/2 < θ$$

in order to prevent the harmonic wave from colliding with the facet 920 and to output satisfactory harmonic wave. The divergence angle $θ_1$ is preferably in a range in which the intensity of harmonic wave is about $1/e^2$ or less with respect to the peak intensity.

FIG. 9D is a cross-sectional view schematically showing a configuration of an optical waveguide device 980 according to Example 3 of the present invention. In the optical waveguide device 980, a periodic polarization inversion region 34 and a proton exchange optical waveguide 35 is provided on an Mg-doped LiNbO$_3$ substrate 33. An inclined facet 940 is provided on a facet 920 opposite a light-incoming facet 910 of the optical waveguide device 980. The facet 940 is inclined with respect to the optical waveguide 35. Harmonic wave obtained by wavelength conversion is propagated in the optical waveguide 35, totally reflected off the inclined facet 940, and transmitted through a surface S2 of the substrate 33.

When a coherent light source including an QPM-SHG optical waveguide device 980 and a tunable DBR semiconductor laser is applied to an optical disk recording and reproduction apparatus, harmonic wave reflected off the inclined facet 940 is transmitted through a substrate surface S2, collimated by a collimator lens, and converged by an objective lens onto an optical disk. The convergence property significantly influences a reproduction property. Coherent light having a low level of wavefront aberration is preferable.

In the Mg-doped LiNbO$_3$ substrate 33 in which the periodic polarization inversion region 34 is provided, the rate of wet etching varies between the polarization inversion region and the substrate. Therefore, concave and convex portions are created in the polarization inversion portion and the substrate portion using chemical etching when a polishing agent is used for polishing the inclined surface 940, though such a problem does not arise in mechanical processing. The concave and convex portions causes aberration in the harmonic wave reflected off the inclined surface 940, thereby deteriorating the convergence property of the light through the objective lens.

The pitch of the polarization inversion is about 3 μm. When periodic polarization inversion is created near a light-exiting facet, it is difficult to provide an inclined surface in a portion which does not have the inversion. Therefore, in the structure of FIG. 9D of Example 3, the periodic polarization inversion region 34 is not provided in the vicinity of the inclined surface 940. Therefore, the polishing process does not create concave and convex portions, resulting in a mirror surface.

A wavelength conversion element as an optical waveguide device and a semiconductor laser are integrated with each other into a module by planer coupling.

Figure 10:
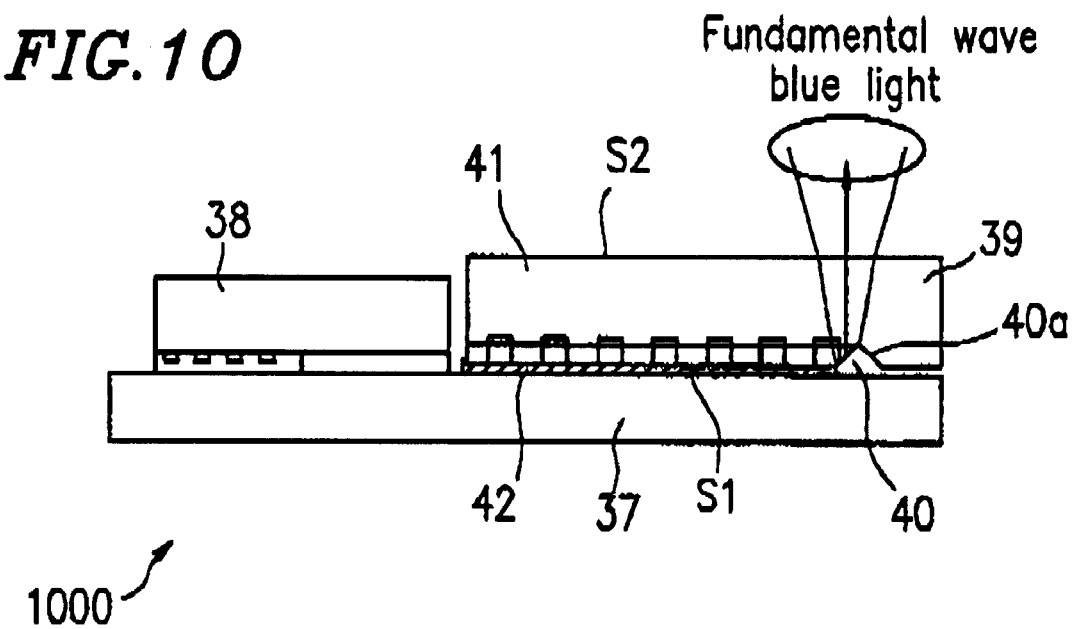
FIG. 10 is a cross-sectional view schematically showing a structure of a coherent light source (SHG blue laser) including an optical waveguide device, in which a groove is provided in an optical waveguide, and a tunable DBR semiconductor laser, in Example 3.

FIG. 10 is a cross-sectional view schematically showing a structure of a planer-coupling light source module 1000 including the optical waveguide device 39 of Example 3. A tunable DBR semiconductor laser 38 and the optical waveguide device 39 are fixed on a submount 37 of Si and the like. An optical waveguide as well as the tunable DBR semiconductor laser 38 and the optical waveguide device 39 are tightly attached to a surface of the submount 37. Therefore, the precision of the depth direction of the optical waveguide can be improved. Further, light is reflected off a side 40a of a groove 40 provided on the optical waveguide of the optical waveguide device 39. The reflected light is then transmitted toward a surface S2 of an Mg-doped LiNbO$_3$ substrate 41 (i.e., the upper side of the module) which is opposite a surface S1 of the substrate 41. In the planer-coupling module, a cladding layer 42 is necessarily provided on the surface of the optical waveguide. This is because the propagation loss of the optical waveguide is significantly increased due to contact of the submount 37 and the optical waveguide. To prevent this, the cladding layer having a thickness of about 100 nm or more is required. The cladding layer also plays a role in better alignment of the active region of the semiconductor laser and the optical waveguide device in the height direction of the optical waveguide. The thickness of the cladding layer 42 can be precisely adjusted on the order of a submicron or less.

However, when the cladding layer 42 is deposited on the surface S1 of the substrate and the entire groove 40, the reflectance of the groove 40 is decreased due to the refractive index of the cladding layer 42. For example, When the angle (θ) the side 40a of the groove 40 and the optical waveguide attain is 45°, total reflection is established if $n_1/n_2 < \sin(45°) \cong 0.7$ where $n_1$ is the refractive index of the cladding layer 42; and $n_2$ is the effective refractive index of the optical waveguide (Snell's law). In Example 3, when the Mg-doped LiNbO$_3$ substrate 41 is used as a substrate, the refractive index $n_2$ is about 2.2. Therefore, the cladding layer 42 needs to be made of a material having a refractive index $n_1$ of about 1.54 or less. However, when the cladding layer 42 on the groove 40 is selectively removed by photolithography or the like, an influence of the cladding layer 42 on the total reflection surface 40a can be removed.

Further, guided light can be divided into fundamental wave and harmonic wave using the cladding layer 42 or a film selectively deposited on the total reflection surface 40a. For example, the refractive index $nf_1$ of the optical waveguide on the Mg-doped LiNbO$_3$ substrate 41 is about 2.2 with respect to a fundamental wave having a wavelength of about 850 nm; and the refractive index $nf_2$ thereof is about 2.4 with respect to a harmonic wave having a wavelength of about 425 nm. Therefore, to establish total reflection, $nc_2/nf_2 < \sin(\theta) < nc_1/nf_1$ needs to be satisfied where $nc_1$ is the refractive index of the cladding layer 42 with respect to the fundamental wave, and $nc_2$ is the refractive index of the cladding layer 42 with respect to the harmonic wave. Therefore, in this case, $nc_1$ is less than or equal to about 1.54, and $nc_2$ is less than or equal to about 1.70. Therefore, when the layer is made of a material having a refractive index of about 1.54–1.7 and the thickness thereof is appropriate, only the harmonic wave is totally reflected off the layer. Examples of such a material of the layer include various materials, such as Al$_2$O$_3$ and SiN$_x$. Moreover, using a multi-layer film, the fundamental wave and the harmonic wave may be perfectly separated from each other.

In the coherent light source including the optical waveguide device performing wavelength conversion, it is important to monitor the output fundamental wave and stabilize the amount of light along with effectively taking a harmonic wave component. When the fundamental wave and the harmonic wave can be separated from each other, a mechanism for monitoring the fundamental wave can be integrated with the coherent light source. Further, the fundamental wave component which is mixed into the harmonic wave output to the outside can be reduced, whereby a wavelength separation filter is not required.

Applications in which the coherent light source (light source module) including a semiconductor laser and the optical waveguide device of the present invention will be described below. When the light source module is applied to an optical disk recording and reproduction apparatus, an optical information processing device, or the like, it is useful to integrate a function for detecting light used in information processing with the module. For example, when the light source module is included in an optical disk recording and reproduction apparatus, light reflected off an optical disk is detected by a photodetector provided adjacent to the module to read signals. Such integration allows a simple optical system, tolerable assembly precision, cost reduction, and the like.

In the optical waveguide device of the present invention, light can be output through a surface of a substrate, thereby making it easy to integrate an optical detection function with the optical waveguide device. Specifically, a photodetector can be easily integrated with the optical waveguide device in the vicinity of a light emitting surface of the optical waveguide device. In this case, light leakage from an optical waveguide may enter the photodetector integrated on the periphery of the optical waveguide, so that signal detection is impaired. For example, when the optical waveguide device has a wavelength conversion capability, a harmonic wave of about 10 mW is generated from a fundamental wave of about several tens of mW. In this case, light leakage of the fundamental wave reaches about 10 mW, so that such light leakage exceeds the detected harmonic wave (i.e., light reflected off the optical disk and returned via an optical system to the photodetector). Therefore, signal detection is significantly impaired. To prevent this, light leakage from the optical waveguide needs to be blocked from the photodetector.

In the optical waveguide device of Example 3, light reflected off a groove provided on an optical waveguide is output through a back surface of the optical waveguide, light leaked from the optical waveguide can be very easily separated from the output light. Specifically, the back surface of the substrate excluding a portion through which light reflected off the groove is transmitted is covered with a film absorbing a fundamental wave and a harmonic wave, thereby making it possible to substantially block any light leakage. For example, a portion of the back surface of the substrate on which the groove is provided and a light-incoming facet of the optical waveguide device are covered with a protection resist. Thereafter, a light absorption film is deposited on the entire substrate. The protection resist and the light absorption film are removed which cover a back surface of the groove and the light-incoming facet. The optical waveguide device is thus produced. With such an optical waveguide device, light leakage to the photodetector can be substantially perfectly prevented.

Instead of the light absorption film, a film capable of reflecting light, such as a metal film, may be used to prevent light leakage.

Further, in Example 3, the angle the reflection surface of the V-shaped groove and the substrate surface S1 attain is an obtuse angle (>90°). Alternatively, the angle the reflection surface of the groove and the substrate surface S1 attain may be an acute angle. In this case, light is transmitted through the substrate surface S1, thereby obtaining effects similar to that of Example 2.

Figure 11:
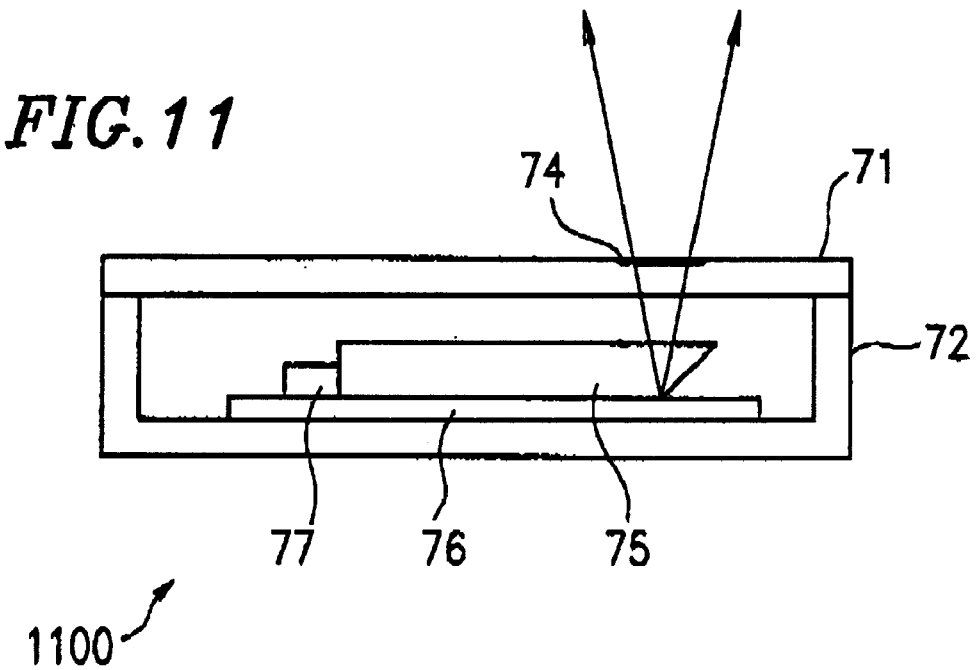
FIG. 11 is a cross-sectional view showing a configuration of Example 3 in which a diffraction grating is provided on a sealing plate which seals a concave package in which a coherent light source is provided.

As described above, when the light source module is used in an optical system in an optical pickup or the like, a diffraction grating such as hologram is generally provided in an optical path of an emitted beam to perform detection of various signals. A specific example of such a case will be described below in Example 4. When the coherent light source 100 of the present invention is applied to such an optical system using a diffraction grating as shown in FIG. 11, a diffraction grating 74 may be provided on a transparent substrate 71 sealing a concave package 72. In this case, the number of parts can be reduced as compared with conventional optical systems in which the diffraction grating is provided as an individual part. In FIG. 11, reference numeral 75 indicates an optical waveguide device, reference numeral 76 indicates a submount, and reference numeral 77 indicates a semiconductor laser.

EXAMPLE 4

In Example 4, a coherent light source including an optical waveguide device and a semiconductor laser, an integrated unit including the coherent light source and a photodetector which are integrated with the same submount, and an optical pickup including the integrated unit will be described.

Figure 12:
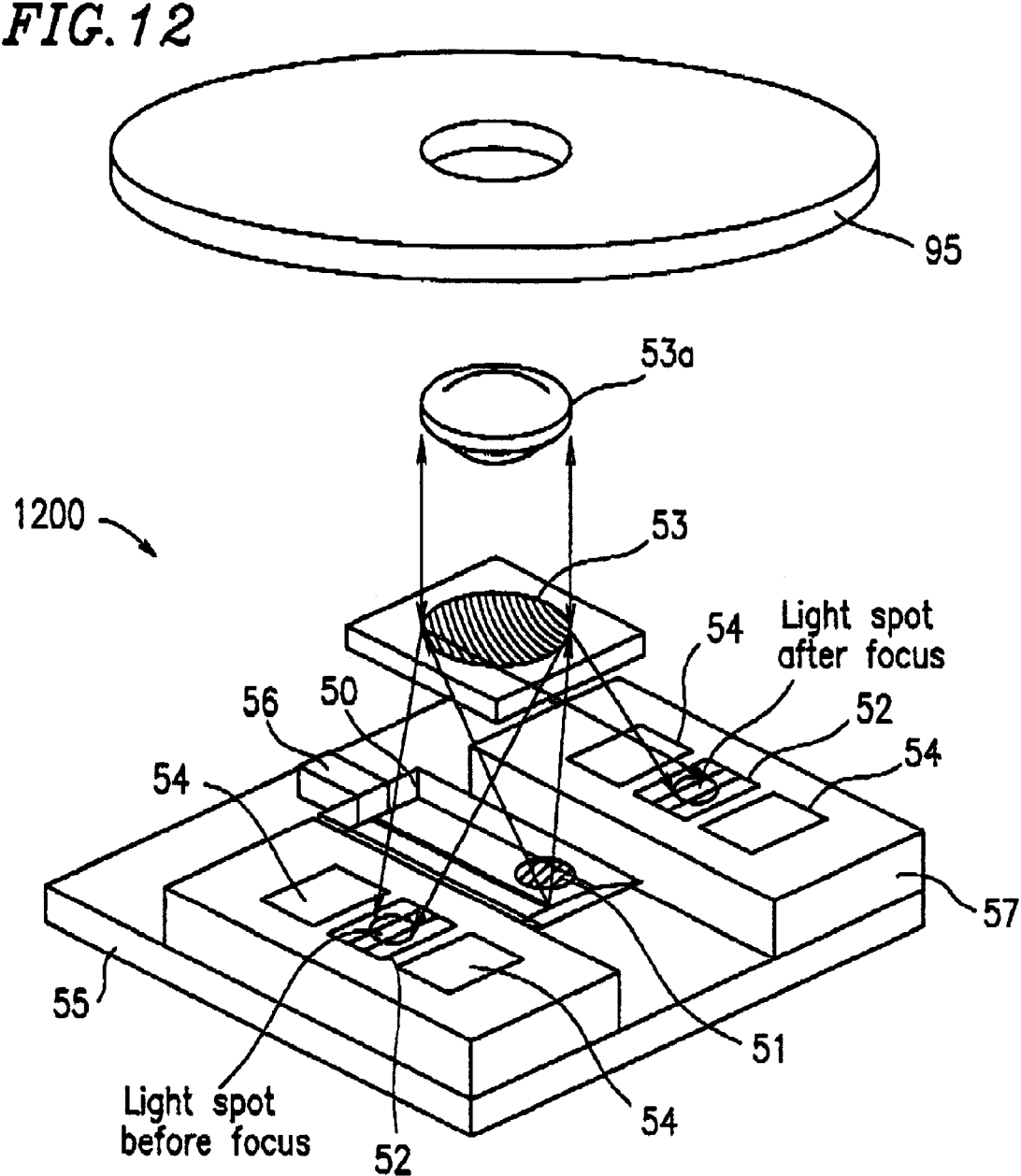
FIG. 12 is a perspective view schematically showing a structure of an optical pickup according to Example 4 of the present invention, in which the coherent light source of Example 1 and photodetectors are integrated with the same surface of a submount, the optical pickup further including an optical system.

FIG. 12 is a perspective view schematically showing a structure of an optical system of an optical pickup 1200 for optical disks according to Example 4 of the present invention. The optical pickup 1200 includes an integrated unit, and a hologram 53 and an objective lens 53a as a focusing optical system. The integrated unit includes a light source module and photodetectors which are provided on the same submount 55. The light source module includes an optical waveguide device 50 (QPM-SHG device) and a tunable DBR semiconductor laser 56. The optical waveguide device 50 is an optical waveguide device of Example 1 shown in FIG. 1 in which light is output through the substrate surface S2 opposite the substrate surface S1 on which an optical waveguide is provided. A diffraction grating 51 is provided on a substrate surface S2 of the optical waveguide device 50. The photodetectors are provided on silicon substrates 57 provided on opposite sides of the light source module (50, 56). The photodetectors include focusing photodetectors 52 having center portions and pheripheral portions, and tracking photodetectors 54 provided on opposite sides of the focusing photodetectors 52. The tracking photodetectors 54 are provided in a direction substantially perpendicular to the grate of the diffraction grating 51.

In the optical pickup 1200, light reflected off an inclined surface of the optical waveguide is split into three light beams of 0th order and ±1st orders by the diffraction grating 51. The 0th order light beam is applied to a target track on an optical disk 95. The reflected light is incident to the focusing photodetectors 52 which in turn detects an RF signal. When the reflected light from the optical disk 95 is diffracted by the hologram 53, the hologram 53 works as a lens to bring the reflected light into a light spot before a focus on one of the focusing photodetectors 52, and to bring the reflected light into a light spot after the focus on the other of the focusing photodetectors 52. Therefore, a focusing error signal can be obtained by a so-called spot size detection (SSD) technique. The ±1st order light generated at the diffraction grating 51 are subbeams which are used for detecting a tracking error signal by a so-called 3-beam tracking technique. Such subbeams are detected by the tracking photodetectors 54. The tracking error signal is obtained based on a differential output signal of the tracking photodetectors 54.

In the above-described optical pickup using a combination of the 3-beam tracking technique and the SSD technique, the integrated unit of the present invention is effectively used, since signal detection is easily performed using a hologram. In particular, for the 3-beam tracking technique, a diffraction grating is provided close to a light source. Therefore, the integrated unit (50, 51, 52, 54, 55, 56) of the present invention is effective since the diffraction grating can be provided on a surface of a substrate of an optical waveguide device. Other examples of the servo signal detection system useful for the optical pickup using a hologram are a phase difference tracking system, a knife edge focusing detection system, and the like. In these systems, an optical pickup 1200 including the integrated unit of the present invention can be used.

In Example 4, the submount 55 is made of silicon crystal having a thickness of about 500 µm. Positioning markers are provided on the submount 55 in advance so that the optical waveguide device 50, the tunable DBR semiconductor laser 56, and the photodetectors 52 and 54 are aligned with the markers under a microscope, and fixed on the submount 55, in this order. In Example 4, light is output from the optical waveguide device 50 in a vertical direction. Therefore, the tunable DBR semiconductor laser 56, the optical waveguide device 50, and the photodetectors 52 and 54 are provided on the same submount 55, and can be therefore efficiently assembled. In the optical system of the optical pickup, the spots of the reflected light need to be precisely guided to the photodetectors provided on the separate regions as shown in FIG. 12. The light source and the photodetectors must be precisely aligned with each other. In the optical pickup of Example 4, such alignment can be performed under a microscope. In addition, since the light source is positioned close to the photodetectors, a change the positional relationship between the light source and the photodetectors due to a change in ambient temperature is extremely small. Therefore, the optical system is stable. Conventionally, an optical system of an optical pickup in which a semiconductor laser light source and photodetectors are provided on the same substrate has been proposed. In the optical pickup of Example 4, the light source includes a semiconductor laser and an optical waveguide device. Alignment between the semiconductor laser and the optical waveguide device and alignment between the light source and photodetectors are performed on the same submount. This effect is not conventionally obtained.

In Example 4, a coherent light source and photodetectors are combined. The coherent light source includes an optical waveguide device in which light is totally reflected off a facet (inclined surface) of an optical waveguide and output through a substrate surface S2 opposite a substrate surface S1. Alternatively, a coherent light source including an optical waveguide device in which light is totally reflected off a groove provided in the vicinity of a surface S1 of a substrate and output through a substrate surface S2 opposite the substrate surface S1 can be similarly included in the integrated unit.

EXAMPLE 5

In Example 5, an integrated unit in which a stray light component input to a photodetector is suppressed will be described below.

In the integrated unit shown in FIG. 12, the photodetectors are provided on the silicon substrates 57 having a thickness of about 1 mm. The photodetectors are positioned higher than the substrate surface S2 of the optical waveguide device 50 having a thickness of about 500 µm with reference to a surface of the submount 55. Such an arrangement causes signal error due to the stray light component to be reduced. Specifically, a portion of light guided in the optical waveguide device 50 is reflected off the substrate surface S2 of the optical waveguide device 50 and reflected mulitple times within the substrate of the optical waveguide device 50, and is then transmitted through a side of the substrate of the optical waveguide device 50. However, such light does not reach surfaces of the photodetectors. Therefore, such stray light does not cause a signal error. A multi-layer antireflection coating whose reflectance is about 0.1% both for fundamental wave having a wavelength of about 850 nm and blue light having a wavelength of about 425 nm converted from the fundamental wave is provided on the substrate surface S2 of the optical waveguide device 50. However, loss of signal light occurs at the hologram or the diffraction grating. In addition, the fundamental wave has greater lens action than that of the blue light, so that slight reflected light causes significant stray light. Therefore, the configuration of the optical pickup 1200 shown in FIG. 12 can effectively prevent the stray light from reaching the surfaces of the photodetectors.

Figure 13:
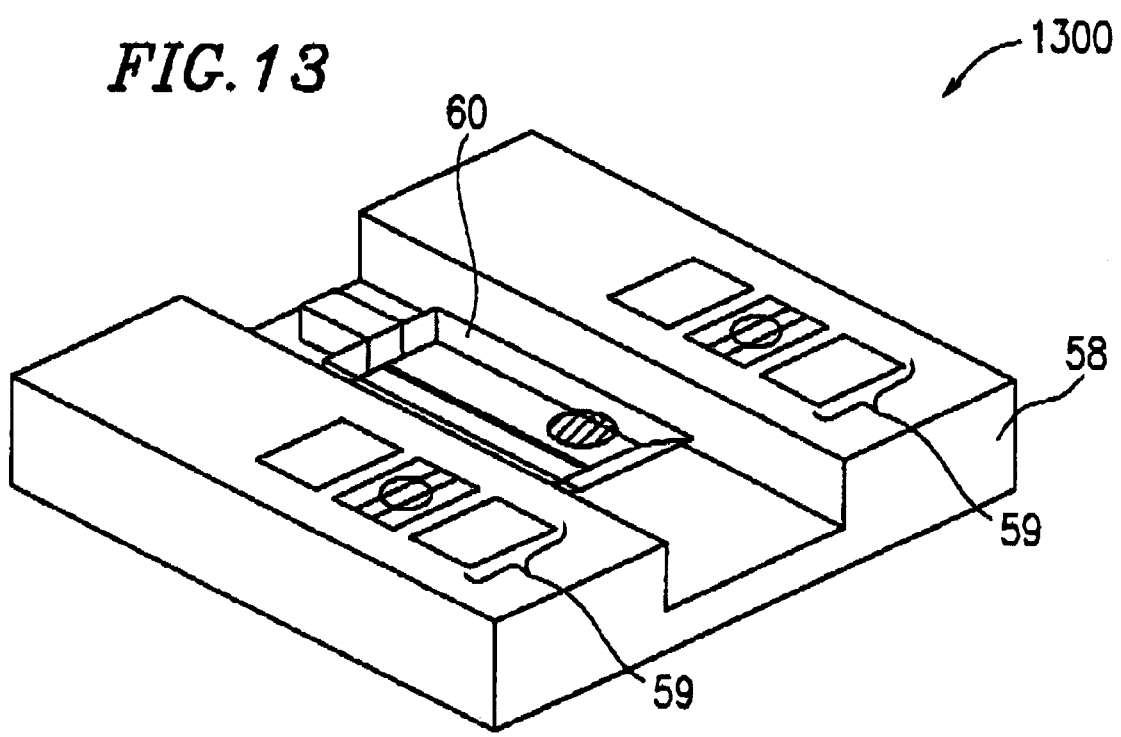
FIG. 13 is a perspective view schematically showing a structure of an integrated unit according to Example 5 of the present invention, in which the coherent light source of Example 1 and photodetectors are integrated with the same surface of a submount.

The same effects can be obtained in an integrated unit 1300 shown in FIG. 13 in which photodetectors 59 are provided on a submount 58 of silicon and the submount 58 has a concave portion in which an optical waveguide device 60 is provided. In order to provide such a concave shape in the submount 58, anisotropic etching is effectively applied to the silicon crystal. The anisotropic etching can secure a high level of plane precision in the bottom portion of the concave as compared with cutting.

Figure 14:
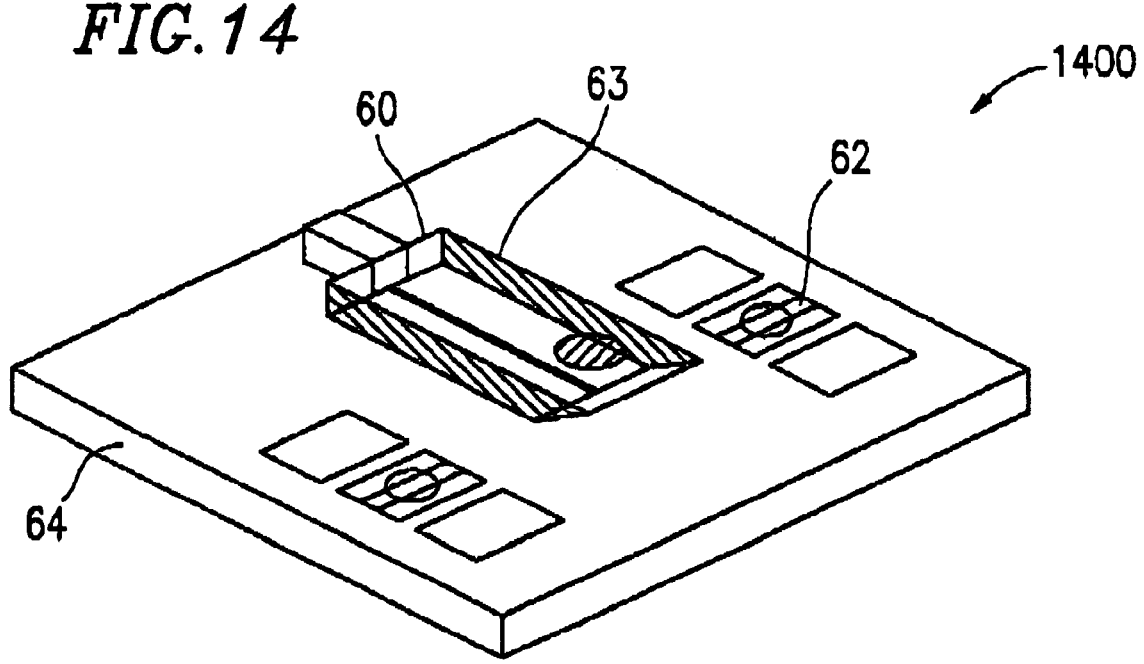
FIG. 14 is a perspective view schematically showing a structure of another integrated unit according to Example 5 of the present invention, in which the coherent light source of Example 1 and photodetectors are integrated with the same surface of a submount.

As shown in FIG. 14, in an integrated unit 1400, a light-shielding member 63 may be provided between an optical waveguide device 60 and a photodetectors 62 which are provided on a submount 64 so that stray light can be prevented from reaching a surface of the photodetectors 62. In Example 4, the light-shielding member 63 is an aluminum deposition film provided on sides of the optical waveguide device 60. For comparison, another integrated unit is provided in which the aluminum deposition film is not provided on the sides of the optical waveguide device 60. In this integrated unit, a large direct current is overlapped with the output of each photodetector, so that an RF signal having a sufficient amplitude cannot be detected. The light-shielding member 63 may be a material having a light reflection capability or a material having a light absorption capability. A typical amount of light does not cause the temperature of the light-shielding member 63 to be problematically increased.

Figure 15:
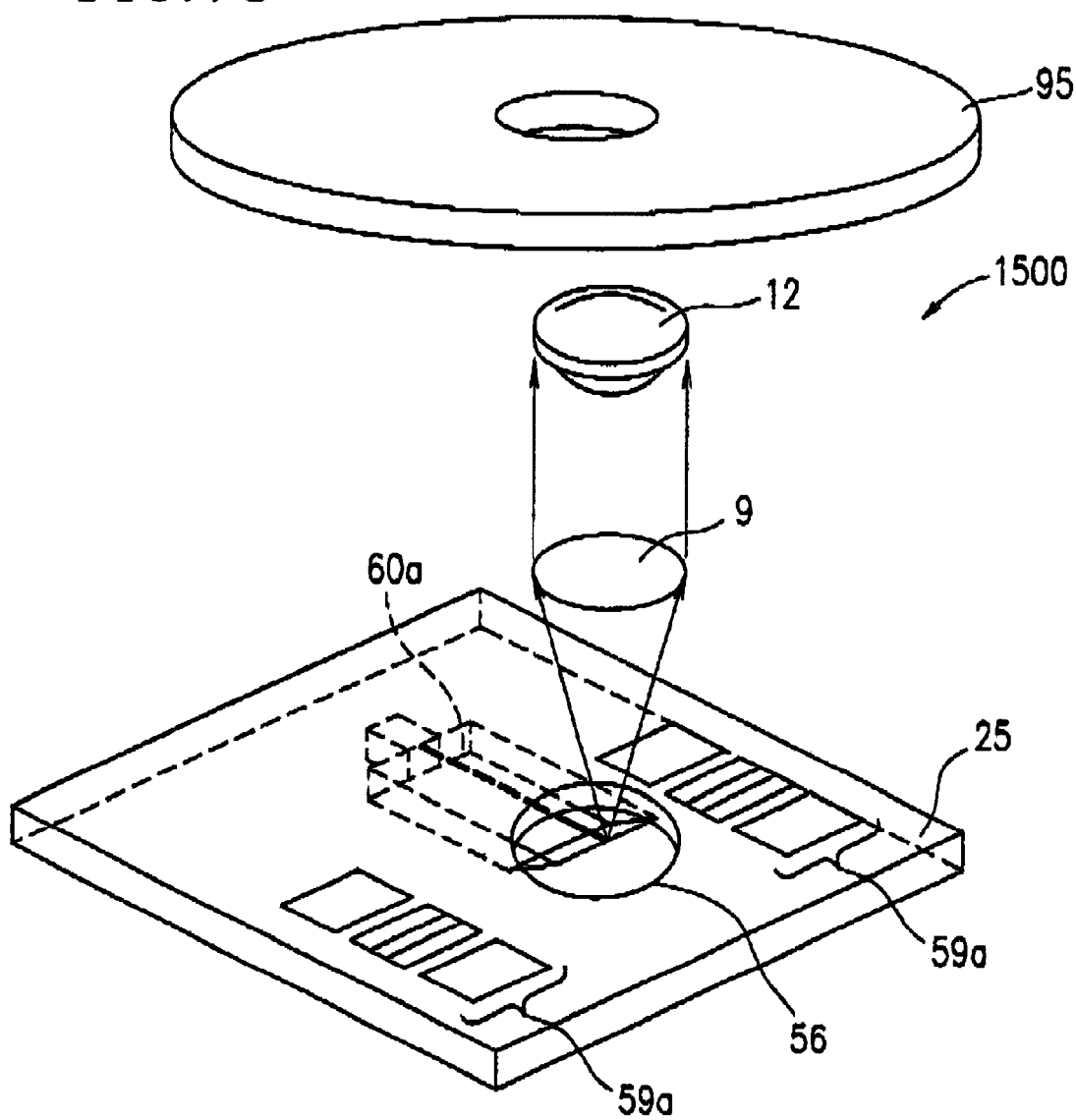
FIG. 15 is a perspective view schematically showing a structure of another integrated unit according to Example 5 of the present invention, in which the coherent light source of Example 2 is provided on one surface of a submount and photodetectors are provided on the other surface of a submount.

In an optical pickup 1500 including an SHG blue laser of Example 2 and photodetectors, as shown in FIG. 15, an optical waveguide device 60a is provided on one side of a submount 25 and photodetectors 59a are provided on a side opposite that side of the submount 25. As shown in FIG. 7 (integrated unit 700), a window 26 needs to be provided on the submount 26 in the optical waveguide device in which blue light is output through a substrate surface S1 of the optical waveguide device. The blue light transmitted through the window 26 is collimated by a collimator lens 9, and the collimated light is converged by an objective lens 12 onto an optical disk 95. In such a configuration, stray light caused by multiple reflection within the substrate of the optical waveguide device 60a is blocked by the window 26. In the configuration of the optical pickup 1500 as shown in FIG. 15, the photodetectors 59a are provided on a side of the submount 25 on which the optical waveguide device 60a is not provided. Therefore, the stray light can be prevented from affecting signals without the above-described light-shielding member or concave structure.

EXAMPLE 6

Astigmatism which occurs in an optical waveguide device will be described below with reference to FIGS. 16A through 16C.

Figure 16A:
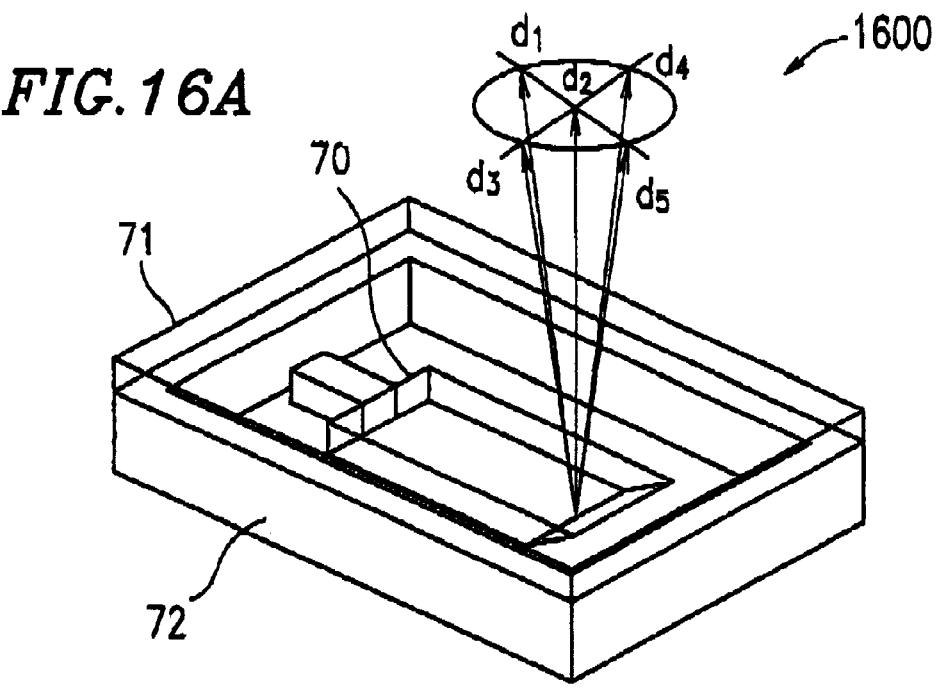
FIG. 16A is a perspective view showing a configuration according to Example 6 of the present invention in which a concave package in which a coherent light source is provided is sealed with a birefringence sealing plate.
Figure 16B:
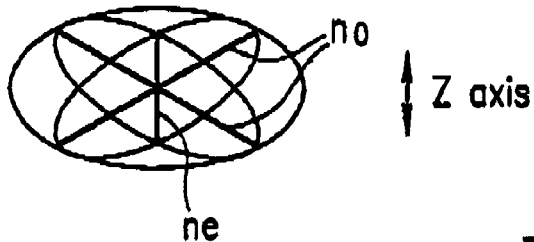
FIG. 16B is a diagram showing an index ellipsoid of the birefringence sealing plate shown in FIG. 16A.
Figure 16C:
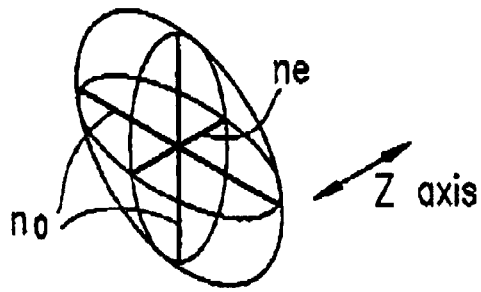
FIG. 16C is a diagram showing an index ellipsoid of a substrate of an optical waveguide device shown in FIG. 16A.

The optical waveguide device 100 of Example 1 shown in FIG. 1A includes a substrate 70 (waveguide substrate) of X plate LiNbO$_3$ crystal having an axis configuration shown in FIG. 16C. In the optical waveguide substrate 70 of an optical pickup 1600, guided light is propagated as extraordinary light, and a fundamental wave having a wavelength of about 850 nm is converted into a harmonic wave having a wavelength of about 425 nm. The light is reflected off an inclined facet opposite a light-incoming side of the optical waveguide and bent into an angle of 90°. The reflected light is propagated in the optical waveguide substrate 70 as diverging light beams having various direction components as indicated by arrows $d_1$, $d_2$, $d_3$, $d_4$, and $d_5$ in FIG. 16A. The light beams $d_1$, $d_2$, and $d_5$ which are extraordinary light are affected by a refractive index $n_o$. The light beams $d_3$ and $d_4$ which are slightly ordinary light are affected by a refractive index $n_o$. The refractive index of the LiNbO$_3$ crystal with respect to the extraordinary light is about 2.2. The refractive index of the LiNbO$_3$ crystal with respect to the ordinary light is about 2.28 which is higher than that with respect to the extraordinary light. Therefore, the phases of the light beams $d_3$ and $d_4$ are delayed from the phases of the light beams $d_1$, $d_2$, and $d_5$. As a result, the wavefront of the light beams transmitted from the optical waveguide has curvature of a larger radius in a direction parallel to the optical waveguide direction than that in a direction substantially perpendicular to the optical waveguide direction. The wavefront after being collimated has an astigmatism component.

A sealing plate 71 shown in FIG. 16A is provided for sealing a concave package 72. The sealing plate 71 can reduce the above-described astigmatism. In Example 6, the sealing plate 71 is made of Z-plate LiNbO$_3$ crystal (the Z-axis of the crystal is substantially perpendicular to the substrate), and the thickness thereof is about 500 µm which is the same as the thickness of the optical waveguide substrate 70. Light emitted from the optical waveguide device is propagated in the sealing plate 71 as diverging beams. Therefore, the light beams $d_1$, $d_2$, and $d_5$ are affected by the refractive index $n_o$ with respect to ordinary light while the light beams $d_3$ and $d_4$ are slightly affected by the refractive index $n_o$ with respect to extraordinary light, in contrast with when the light beams are propagated in the optical waveguide substrate 70. The phases of the light beams $d_3$ and $d_4$ are leading from the phases of the light beams $d_1$, $d_2$, and $d_5$. Such leading phases offset the delays in the optical waveguide substrate 70. Therefore, the astigmatism of the light beams transmitted through the sealing plate 71 are removed, so that the light beams form a spherical wave without aberration. When a glass plate is used as the sealing plate 71, astigmatism of about 15 m$\lambda$ is observed. When the Z plate LiNbO$_3$ substrate is used as the sealing plate 71, the astigmatism can be reduced to the limitation of measurement or below (about 5 m$\lambda$ or less).

Figure 17:
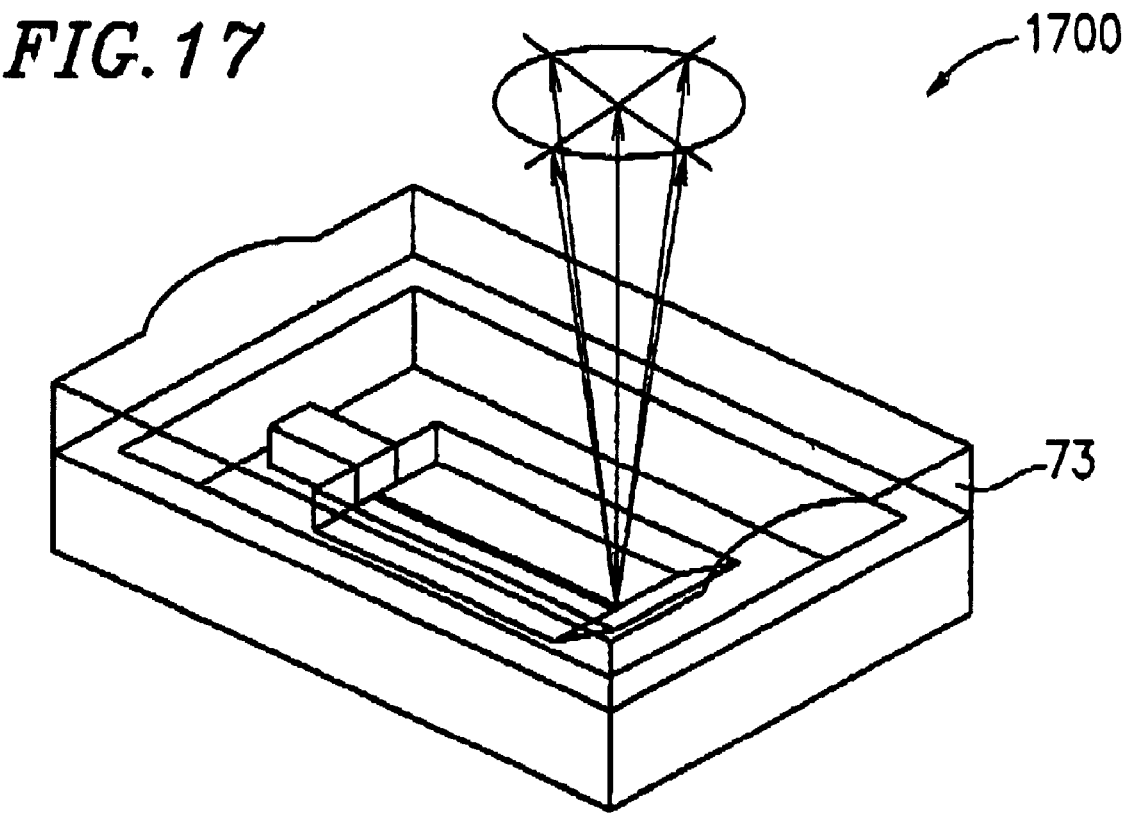
FIG. 17 is a perspective view showing a configuration of Example 6 in which the concave package in which the coherent light source is provided is sealed by a cylindrical lens.
Figure 18:
FIG. 18 is a cross-sectional view showing an exemplary cylindrical lens shown in FIG. 17.

Referring to FIG. 17, in an optical pickup, a substrate 73 having a shape of a cylindrical lens is used as a sealing plate to compensate for astigmatism in a way similar to that shown in FIGS. 16A through 16C. In Example 6, #7059 glass produced by Corning Inc. is used as the substrate 73. Production cost of the cylindrical substrate 73 by polishing is very high. The cylindrical shape may be approximated by a shape which has a stepped profile as shown in FIG. 18. To create such a profile, patterning of photoresist by photolithography and etching with hydrofluoric acid are repeated 3 times to form a 8-step profile. A substrate 73 having the stepped profile 73a shown in FIG. 18 approximate to the cylindrical lens can generate a satisfactory wavefront having substantially no astigmatism. Further, in the example shown in FIG. 17, the sealing plate 73 may be advantageously made of low-cost optical material such as glass or plastic. In particular, for mass production, the sealing plate 73 may be an injection molded plastic substrate, thereby reducing production cost.

In Example 6, the sealing plate for sealing the package is made of a second birefringence optical crystal in which an optical axis of the sealing plate is orthogonal to an optical axis of an optical waveguide substrate, or the sealing plate is in the shape of a cylindrical lens. Alternatively, a second birefringence optical crystal or a cylindrical lens may be additionally provided in an optical path. The substrate surface S2 through which light is transmitted from the optical waveguide device may be in the shape of a cylindrical.

Figure 19:
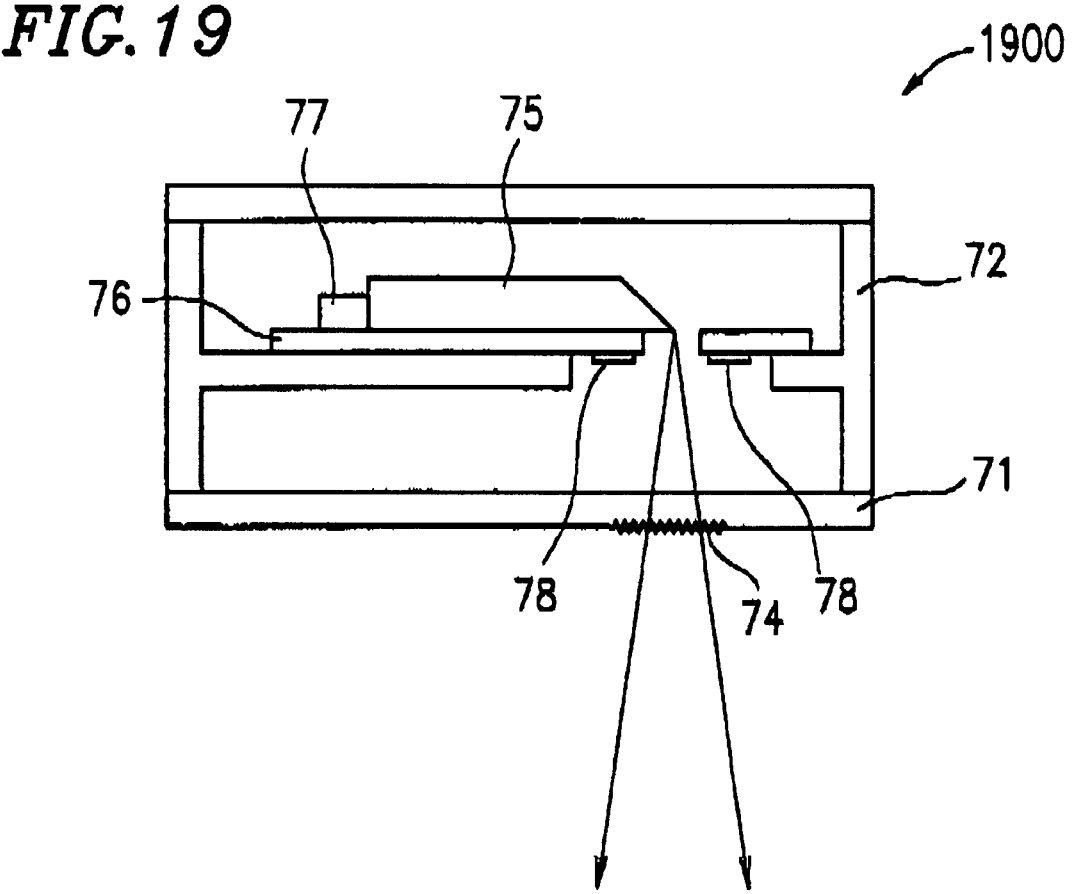
FIG. 19 is a cross-sectional view showing a configuration of Example 6 in which the concave package in which the coherent light source is provided is sealed by a sealing plate on which a diffraction grating is provided.
Figure 20:
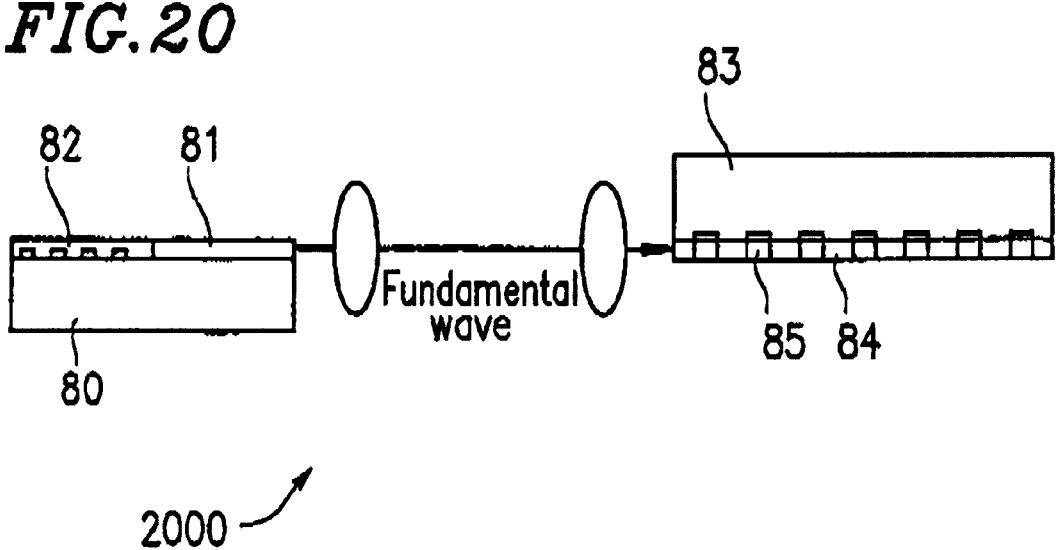
FIG. 20 is a cross-sectional view showing a configuration of a conventional SHG blue laser.
Figure 21:
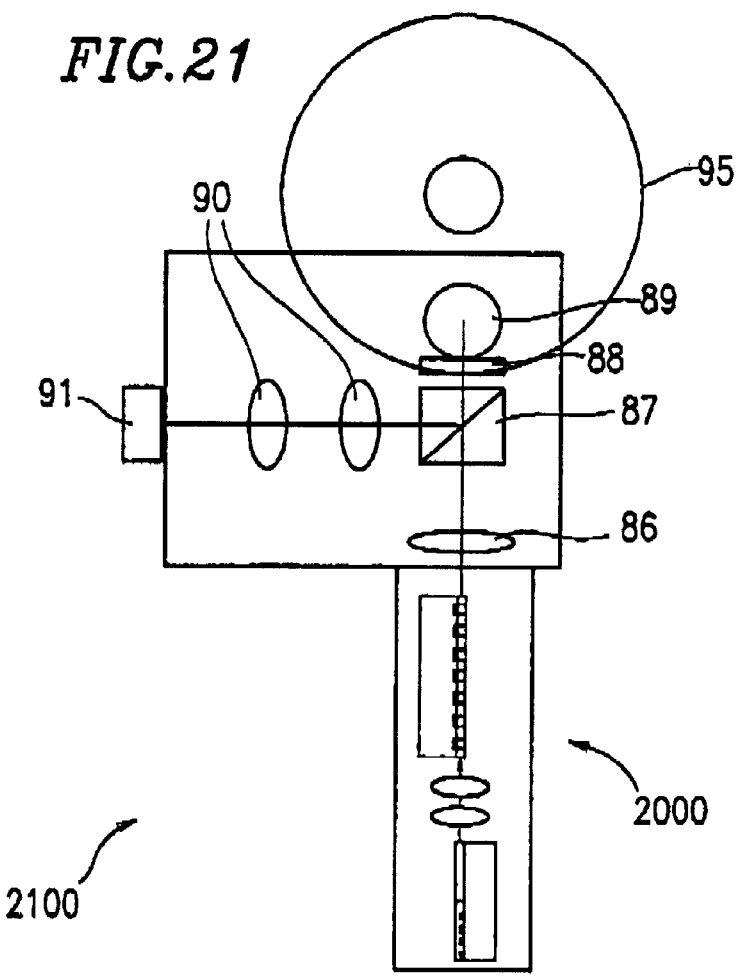
FIG. 21 is a diagram showing an optical pickup including the conventional SHG blue laser shown in FIG. 20.
Figure 22:
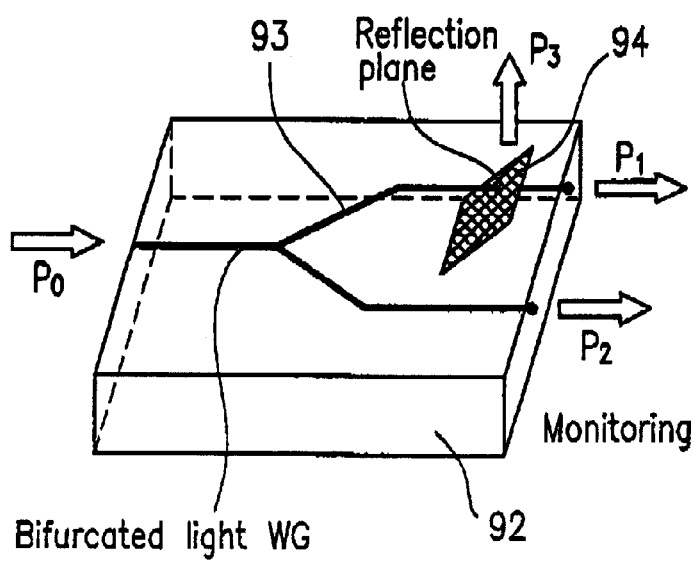
FIG. 22 is a perspective view showing a structure of a conventional optical waveguide device having a cut.

In FIG. 19 showing an optical pickup 1900, in the light source module in which light is output through the substrate surface S1 on which the optical waveguide device is provided, a diffraction grating 74 is provided on a transparent sealing substrate 71 so that the number of parts can be reduced. In this case, a window 26 is provided in a submount 76 and a concave package 72 through which light is output. In such a configuration, a photodetector 78 and a waveguide device 75 are aligned with the + of the submount 76 so that the precision of positional relationship between the optical waveguide device 75 and the photodetector 78 can be secured.

As described above, according to the present invention, an optical waveguide device includes a substrate having a first and second surfaces, and an optical waveguide provided on the first surface of the substrate. Guided light is totally reflected off an inclined facet of the optical waveguide so that the reflected light can be output through the first or second surface. Therefore, in a coherent light source of the present invention including the optical waveguide device and the semiconductor laser, returning light to the semiconductor laser can be reduced, thereby improving noise characteristics. Further a small-sized optical pickup can be achieved using the coherent light source. Therefore, a practical effect is significant.

When the thickness of the substrate included in the optical waveguide device is about 0.3 mm or more and about 1.0 mm or less, the optical waveguide device is easy to handle and is suitable for mass production. Moreover, astigmatism can be reduced to an aberration tolerable level at a focusing spot.

Further, the substrate of the optical waveguide device may be made of a nonlinear optical material. A fundamental wave of the semiconductor laser incident to the optical waveguide of the optical waveguide device is wavelength converted to a second harmonic wave. When the second harmonic wave is transmitted through the first surface, an antireflection coating to the second harmonic wave may be provided on the first surface so that the returning light can be prevented from being reflected off the first surface. Therefore, it is possible to prevent deterioration of a signal waveform caused by interference of the re-reflected returning light at the first surface with the transmitted light from the optical waveguide.

Further, according to the present invention, the guided light is totally reflected off the inclined facet of the optical waveguide provided on the first surface of the substrate of the optical waveguide device. The reflected light is output through the first surface. Therefore, in a coherent light source of the present invention including the optical waveguide device and the semiconductor laser, returning light to the semiconductor laser can be reduced, thereby improving noise characteristics. Further a small-sized optical pickup can be achieved using the coherent light source. Therefore, a practical effect is significant.

In the optical waveguide device, when the inclined facet of the optical waveguide is inclined at an angle of about 45° (45±1°) with respect to the optical waveguide, preferably, coma aberration does not occur at a focusing light spot.

Further, the substrate of the optical waveguide device may be made of a nonlinear optical material. When a fundamental wave of the semiconductor laser incident to the optical waveguide of the optical waveguide device is wavelength converted to a second harmonic wave, if the harmonic wave is in a guide mode, the thickness of the substrate can be smaller than in a radiation mode so that the astigmatism or the like can be preferably reduced. Moreover, in the case of the guide mode, a groove or the like may be provided on the first surface so that an inclined facet can be provided, thereby making it easy to achieve mass production.

In the optical waveguide device, a groove or cut may be provided in the vicinity of the first surface, substantially orthogonal to the optical waveguide. A portion (a side) of the groove or cut can be an inclined facet of the optical waveguide. In this case, such an inclined facet can be easily provided by etching or the like used in a semiconductor process, thereby achieving mass production and cost reduction.

When the first surface of the substrate on which the optical waveguide is provided contact the submount, a cladding layer is provided on the first surface of the substrate excluding the groove so that the refractive index of the cladding layer is prevented from influencing the reflected light.

When the cladding layer is provided on the first surface of the substrate, the side of the groove (the inclined facet of the optical waveguide) can have a total reflection property if a relationship given by:
$\sin(\theta) > n_1/n_2$ is satisfied where $n_1$ is the refractive index of the cladding layer; $n_2$ is the effective refractive index of the optical waveguide with respect to light guided in the optical waveguide; and $\theta$ is the angle attained from intersection of the first surface of the substrate and a normal line to the side (inclined facet) of the groove.

Further, when a relationship given by:

$$t_2 < t < t_1$$

is satisfied where $t_1$ is the depth of a guide mode of the fundamental wave guided in the optical waveguide; $t_2$ is the depth of a guide mode of the second harmonic wave guided in the optical waveguide; and t is the depth of the groove, the second harmonic wave is totally reflected off the groove while the fundamental wave passes through the groove, so that the harmonic wave and the fundamental wave can be separated. Alternatively, when a relationship given by:

$$nc_2/nf_2 < \sin(\theta) < nc_1/nf_1$$

is satisfied where $nc_1$ is the refractive index of the cladding layer with respect to the fundamental wave; $nc_2$ is the refractive index of the cladding layer with respect to the second harmonic wave; $nf_1$ is the refractive index of the optical waveguide with respect to the fundamental wave; $nf_2$ is the refractive index of the optical waveguide with respect to the second harmonic wave; and $\theta$ is the angle attained from intersection of the first surface of the substrate and a normal line to the side of the groove, if the thickness of the cladding layer is appropriate, only the harmonic wave is totally reflected off the groove, thereby allowing wavelength separation. Therefore, an amount of the fundamental wave mixed in the harmonic wave can be easily reduced. Further, the output characteristics of the fundamental wave can be monitored by detecting the fundamental wave passing through the groove.

Further, when light is output through the second surface of the substrate opposite the first surface, a diffraction grating may be provided on the second surface so that the number of parts can be reduced.

When light is output through the second surface of the substrate included in the optical waveguide device, a second birefringence optical crystal whose optical axis is orthogonal to that of a birefringence optical crystal included in the substrate is preferably provided in a divergence optical path of the transmitted light from the optical waveguide device, thereby compensating for the astigmatism. Alternatively, the substrate surface (second surface) through which light is transmitted from the optical waveguide device may be substantially in the shape of a cylinder. A cylindrical lens may be provided in the optical path of the transmitted light from the optical waveguide device.

A coherent light source of the present invention includes an optical waveguide device of the present invention and a semiconductor laser. Returning light to the semiconductor laser can be reduced, thereby improving noise characteristics. The coherent light source may be applied to an optical pickup, thereby making it possible to downsize the optical pickup.

Further, using a tunable semiconductor laser, the oscillation wavelength of the semiconductor laser can be fixed in the phase matching wavelength intensity range of an optical waveguide type wavelength conversion device. Therefore, a high level of conversion efficiency can be obtained.

The distance between the light-exiting facet of the semiconductor laser and the light-incoming facet of the optical waveguide is about several micrometers (e.g., 0 μm or more and 10 μm or less) so that a direct coupling is performed without a coupling lens. In this case, returning light from the light-incoming facet is prevented, thereby improving noise characteristics.

In the coherent light source of the present invention, when the optical waveguide device and the semiconductor laser are provided in a concave package, the concave package may be sealed using a sealing plate. The sealing plate may be the above-described second birefringence crystal or the above-described cylindrical lens, thereby reducing the number of parts and therefore reducing cost.

In the integrated unit of the present invention, the coherent light source in which light is output through the second surface opposite the first surface on which the optical waveguide is provided, and the photodetectors are provided on the same surface of the submount. Thereby, the photodetectors can be integrated with the submount in the vicinity of the second surface through which light is output. Moreover, the photodetectors and the coherent light source can be easily and precisely aligned with each other, thereby efficiently assembling the integrated unit.

When light is output through the second surface opposite the first surface of the substrate on which the optical waveguide is provided, a light shielding member is provided between the coherent light source and the photodetectors so that stray light is prevented from reaching the photodetectors. Thereby, signal error due to the stray light can be reduced. The height of the surfaces of the photodetectors may be higher than the surface on the light-exiting side of the coherent light source with reference to the surface of the submount. Alternatively, a concave portion may be provided in the submount surface so that the coherent light source is provided in the concave portion.

In the integrated unit of the present invention, the coherent light source, in which light is output through the first surface of the substrate on which he optical waveguide is provided, is provided on a first surface of the submount, while the photodetectors are provided on a second surface of the submount. Thereby, the stray light is prevented from reaching the photodetectors, without the above-described light shielding member or groove.

Further, when the integrated unit or the coherent light source is provided in the concave package, the concave package may be sealed with a transparent plate on which a diffraction grating is provided. Thereby, the number of parts can be reduced.

Using the integrated unit of the present invention, a small and thin optical pickup can be achieved. A diffraction grating may be provided in the focusing optical system, a substrate surface of the optical waveguide device, or the transparent plate sealing the concave package. Thereby, a stable optical system can be achieved.

A photodetector of the integrated unit may be divided into three regions including a first region (focusing photodetector) at the middle of the photodetector, a second region (tracking photodetector) and a third region (tracking photodetector) on opposite sides of the first region. The second and third regions are directed substantially perpendicular to the gate of a diffraction grating. For example, signal detection can be performed using a 3-beam tracking technique. In this case, the diffraction grating can be provided close to a light source. For example, the diffraction grating may be provided on a substrate surface of the optical waveguide device included in the integrated unit.

Further, the photodetectors may be provided on opposite sides of the coherent light source. Each photodetector is divided into a central portion and a peripheral portion (focusing photodetectors). In addition, a focusing optical system and a second diffraction element (hologram) having lens action are provided. In this case, for example, signal detection can be performed using a spot size detection (SSD) technique. In an optical pickup using a combination of the SSD technique and the 3-beam tracking technique, signal detection using the hologram can be easily performed. Therefore, the integrated unit of the present invention is effective.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical waveguide device comprising:
a substrate having first and second surfaces; and
an optical waveguide provided on the first surface of the substrate, having a light-incoming facet and a facet inclined with respect to the optical waveguide,
wherein guided light incident to the optical waveguide through the light-incoming facet is totally reflected off the inclined facet, and the guided light is transmitted through the first surface of the substrate.

2. An optical waveguide device according to claim 1, wherein the substrate is made of a nonlinear optical material, the guided light incident to the optical waveguide as a fundamental wave is wavelength converted into a second harmonic wave, and the second harmonic wave is transmitted.

3. An optical waveguide device according to claim 2, wherein the second harmonic wave is transmitted through the second surface of the substrate.

4. An optical waveguide device according to claim 3, wherein a thickness of the substrate is about 0.3 mm or more and about 1.0 mm or less.

5. An optical waveguide device according to claim 3, wherein a non-reflection portion is provided on the first surface of the substrate wherein the second harmonic wave is substantially not reflected off the non-reflection portion.

6. An optical waveguide device according to claim 5, wherein the non-reflection portion is made of antireflection coating.

7. An optical waveguide device to claim 3, wherein a diffraction grating is provided on the second surface of the substrate.

8. An optical waveguide device according to claim 2, wherein the second harmonic wave is transmitted through the first surface of the substrate.

9. An optical waveguide device according to claim 8, wherein a non-reflection portion is provided on the first surface of the substrate wherein the fundamental wave is substantially not reflected off the non-reflection portion.

10. An optical waveguide device according to claim 9, wherein the non-reflection portion is made of antireflection coating.

11. An optical waveguide device according to claim 2, wherein the second harmonic wave has a guide mode.

12. An optical waveguide device according to claim 2, wherein the inclined facet of the optical waveguide is a side of a groove provided in the vicinity of the first surface of the substrate wherein the groove is substantially perpendicular to the optical waveguide; and
a relationship given by:

$$t_2 < t < t_1$$

is satisfied where $t_1$ is a depth of a guide mode of a fundamental wave guided in the optical waveguide; $t_2$ is a depth of a guide mode of a second harmonic wave guided in the optical waveguide; and t is a depth of the groove.

13. An optical waveguide device according to claim 2, wherein a cladding layer is further provided on the first surface of the substrate;
The inclined facet of the optical waveguide is a side of a groove provided in the vicinity of the first surface of the substrate wherein the groove is substantially perpendicular to the optical waveguide;
a relationship given by:

$$nc_2/nf_2 < \sin(\theta) < nc_1/nf_1$$

is satisfied where $nc_1$ is a refractive index of the cladding layer with respect to the fundamental wave; $nc_2$ is a refractive index of the cladding layer with respect to the harmonic wave; $nf_1$ is a refractive index of the optical waveguide with respect to the fundamental wave; $nf_2$ is a refractive index of the optical waveguide with respect to the harmonic wave; and $\theta$ is an angle attained from intersection of the first surface of the substrate and a normal line to the side of the groove.

14. An optical waveguide device according to claim 1, wherein an angle attained from intersection of the inclined facet of the optical waveguide and the optical waveguide is about 45±1°.

15. An optical waveguide device according to claim 1, wherein a whole side of the substrate corresponding to the inclined facet of the optical waveguide is inclined with respect to the optical waveguide.

16. An optical waveguide device according to claim 1, wherein the inclined facet of the optical waveguide is a cut provided in the vicinity of the first surface of the substrate, and the cut is substantially perpendicular to the optical waveguide.

17. An optical waveguide device according to claim 1, wherein the inclined facet of the optical waveguide is a groove provided in the vicinity of the first surface of the substrate, and the groove is substantially perpendicular to the optical waveguide.

18. An optical waveguide device according to claim 17, wherein a cladding layer is provided on the first surface of the substrate excluding at least the groove.

19. An optical waveguide device according to claim 17, wherein a cladding layer is provided on the first surface of the substrate.

20. An optical waveguide device according to claim 19, wherein a relationship given by:

$$\sin(\theta) > n_1/n_2$$

is satisfied where $n_1$ is a refractive index of the cladding layer; $n_2$ is an effective refractive index of the optical waveguide with respect to light guided in the optical waveguide; and $\theta$ is an angle attained from intersection of the first surface of the substrate and a normal line to a side of the groove.

21. An optical waveguide device according to claim 1, wherein the substrate is made of a first birefringence optical crystal.

22. An optical waveguide device according to claim 21, further comprising a second birefringence optical crystal provided in an optical path of the transmitted light, wherein an optical axis of the second birefringence optical crystal is orthogonal to an optical axis of the first birefrigence optical crystal of the substrate.

23. An optical waveguide device according to claim 22, further comprising a concave package, wherein the optical waveguide device is provided in the concave package; and the concave package is sealed by the second birefringence crystal.

24. An optical waveguide device according to claim 1, wherein one of the first and second surfaces is substantially in a shape of a cylinder wherein the guided light is transmitted through the one of the first and second surfaces.

25. An optical waveguide device according to claim 1, further comprising a cylindrical lens provided in an optical path of the guide light transmitted from the optical waveguide device.

26. An optical waveguide device according to claim 25, further comprising a concave package, wherein the optical waveguide device is provided in the concave package; and the concave package is sealed by the cylindrical lens.

27. An optical waveguide device according to claim 1, wherein the substrate has a first facet including the light-incoming facet of the original waveguide and a second facet opposite the first facet;

an angle attained from intersection of a plane including a line of intersection of the inclined facet and the first surface of the substrate and a line of intersection of the second facet and the second surface of the substrate, and a direction in which the guided light is transmitted, is greater than half a divergence angle of the guided light transmitted through the second surface of the substrate.

28. An optical waveguide device according to claim 27, wherein a relationship given by:

$$\theta_1/2 < \theta$$

is satisfied where $\theta$ is an angle attained from intersection of a plane including a line of intersection of the inclined facet and the first surface of the substrate and a line of intersection of the second facet and the second surface of the substrate, and a direction in which the guided light is transmitted; and $\theta_1$ is a divergence angle of the guided light output through the second surface of the substrate.

29. An optical waveguide device according to claim 1, further comprising a periodic polarization inversion region provided in the first surface of the substrate.

30. An optical waveguide device according to claim 29, wherein the periodic polarization inversion region is not provided in the vicinity of the inclined facet of the optical waveguide.

31. A coherent light source comprising a semiconductor laser and an optical waveguide device according to claim 1.

32. A coherent light source according to claim 31, wherein the semiconductor laser is a tunable semiconductor laser.

33. A coherent light source according to claim 31, wherein a distance between a light-exiting facet of the semiconductor laser and the light-incoming facet of the optical waveguide is about 0 μm or more and about 10 μm or less.

34. An optical waveguide device comprising:
a substrate having first and second surfaces;
an optical waveguide provided on the first surface of the substrate, having a light-incoming facet and a facet inclined with respect to the optical waveguide; and
a cladding layer provided on the first surface of the substrate, wherein
guided light incident to the optical waveguide through the light-incoming facet is totally reflected off the inclined facet, and the guided light is transmitted through the second surface of the substrate,
and a relationship given by:

$$\sin(\theta) > n_1/n_2$$

is satisfied where $n_1$ is a refractive index of the cladding layer, $n_2$ is and effective refractive index of the optical waveguide with respect to light guided in the optical waveguide, and $\theta$ is an angle attained from intersection of the first surface of the substrate and a normal line to a side of the inclined facet.

35. An optical waveguide device according to claim 35, wherein the substrate is made of nonlinear optical material, the guided light incident to the optical waveguide as a fundamental wave is wavelength converted into a second harmonic wave, and the second harmonic wave is transmitted.

36. An optical waveguide device according to claim 33, wherein a thickness of the substrate is about 0.3 mm or more and about 1.0 mm or less.

37. An optical waveguide device according to claim 35, wherein a non-reflection portion is provided on the first surface of the substrate, and the second harmonic wave is substantially not reflected off the non-reflection portion.

38. An optical waveguide device according to claim 37, wherein the non-reflection portion includes an antireflection coating.

39. An optical waveguide device according to claim 35, wherein the second harmonic wave has a guide mode.

40. An optical waveguide device according to claim 35, wherein the inclined facet of the optical waveguide is a side of a groove provided in the vicinity of the first surface of the substrate wherein the groove is substantially perpendicular to the optical waveguide; and
a relationship given by:

$$t_2 < t < t_1$$

is satisfied where $t_1$ is a depth of a guide mode of a fundamental wave guided in the optical waveguide, $t_2$ is a depth of a guide mode of a second harmonic wave guide in the optical waveguide, and $t$ is a depth of the groove.

41. An optical waveguide device according to claim 34, wherein an angle attained from intersection of the inclined facet of the optical waveguide and the optical waveguide is about 45±1°.

42. An optical waveguide device according to claim 34, wherein a whole side of the substrate corresponding to the inclined facet of the optical waveguide is inclined with respect to the optical waveguide.

43. An optical waveguide device according to claim 34, wherein the inclined facet of the optical waveguide is a cut provided in the vicinity of the first surface of the substrate, and the cut is substantially perpendicular to the optical waveguide.

44. An optical waveguide device according to claim 34, wherein the substrate is made of a first birefringence optical crystal.

45. An optical waveguide device according to claim 44, further comprising a second birefringence optical crystal provided in an optical path of the transmitted light, wherein an optical axis of the second birefringence optical crystal is orthogonal to an optical axis of the first birefringence optical crystal of the substrate.

46. An optical waveguide device according to claim 45, further comprising a concave package, wherein the optical waveguide device is provided in the concave package, and the concave package is sealed by the second birefringence optical crystal.

47. An optical waveguide device according to claim 34, wherein the second surface is substantially in a shape of a cylinder, and the guided light is transmitted through the second surface.

48. An optical waveguide device according to claim 34, further comprising a cylindrical lens provided in an optical path of the guided light transmitted from the optical waveguide device.

49. An optical waveguide device according to claim 48, further comprising a concave package, wherein the optical waveguide device is provided in the concave package, and the concave package is sealed by the cylindrical lens.

50. An optical waveguide device according to claim 34, wherein the substrate has a first facet including the light-incoming facet of the optical waveguide and a second facet opposite the first facet, and an angle attained from intersection of (a) a plane including a line of intersection of the inclined facet and the first surface of the substrate, and a line of intersection of the second facet and the second surface of the substrate, and (b) a direction in which the guided light is transmitted, is greater than half a divergence angle of the guided light transmitted through the second surface of the substrate.

51. An optical waveguide device according to claim 50, wherein a relationship given by:

$$\theta_1/2 < \theta$$

is satisfied where $\theta$ is an angle attained from intersection of a plane including a line of intersection of the inclined facet and the first surface of the substrate and a line of intersection of the second facet and the second surface of the substrate, and a direction in which the guided light is transmitted, and $\theta_1$ is a divergence angle of the guided light output through the second surface of the substrate.

52. An optical waveguide device according to claim 34, further comprising a periodic polarization inversion region provided in the first surface of the substrate.

53. An optical waveguide device according to claim 52, wherein the periodic polarization inversion region is not provided in the vicinity of the inclined facet of the optical waveguide.

54. A coherent light source comprising a semiconductor laser and an optical waveguide device according to claim 34.

55. A coherent light source according to claim 54, wherein the semiconductor laser is a tunable semiconductor laser.

56. A coherent light source according to claim 54, wherein a distance between a light-exiting facet of the semiconductor laser and the light-incoming facet of the optical waveguide is about 0 μm or more and about 10 μm or less.

57. An optical waveguide device, comprising:
a substrate having first and second surfaces;
an optical waveguide provided in the first surface of the substrate, having a light-incoming facet and a facet inclined with respect to the optical waveguide; and
a cladding layer provided on the first surface of the substrate, wherein a guided light incident to the optical waveguide through the light-incoming facet is totally reflected off the inclined facet, and the guided light is transmitted through the first or second surface of the substrate, the inclined facet of the optical waveguide is a groove provided in the vicinity of the first surface of the substrate, and the groove is substantially perpendicular to the optical waveguide, and a relationship given by:

$$\sin(\theta) > n_1/n_2$$

is satisfied where $n_1$ is a refractive index of the cladding layer, $n_2$ is an effective refractive index of the optical waveguide with respect to light guided in the optical waveguide, and $\theta$ is an angle attained from intersection of the first surface of the substrate and a normal line to a side of the groove.

58. An optical waveguide device, comprising:
a substrate having first and second surfaces, the substrate being formed of a nonlinear optical material;
a cladding layer provided on the first surface of the substrate; and
an optical waveguide provided on the first surface of the substrate, having a light-incoming facet and a facet inclined with respect to the optical waveguide, wherein
guided light incident to the optical waveguide through the light-incoming facet is totally reflected off the inclined facet, and the guided light is transmitted through the first or second surface of the substrate,
the guided light incident to the optical waveguide as a fundamental wave is wavelength converted into a second harmonic wave, and the second harmonic wave is transmitted,
the inclined facet of the optical waveguide is a side of a groove provided in the vicinity of the first surface of the substrate wherein the groove is substantially perpendicular to the optical waveguide, and
a relationship given by:

$$nc_2/nf_2 > \sin(\theta) < nc_1/nf_1$$

is satisfied where $nc_1$ is a refractive index of the cladding layer with respect to the fundamental wave, $nc_2$ is a refractive index of the cladding layer with respect to the second harmonic wave, $nf_1$ is a refractive index of the optical waveguide with respect to the fundamental wave, $nf_2$ is a refractive index of the optical waveguide with respect to the second harmonic wave, and $\theta$ is an angle attained from intersection of the first surface of the substrate and a normal line to the side of the groove.

59. An optical waveguide device, comprising:
a substrate having first and second surfaces, the substrate being formed of a nonlinear optical material;
a diffraction grating is provided on the second surface of the substrate; and
an optical waveguide provided on the first surface of the substrate, having a light-incoming facet and a facet inclined with respect to the optical waveguide, wherein
guided light incident to the optical waveguide through the light-incoming facet is totally reflected off the inclined facet, and the guided light is transmitted through the first or second surface of the substrate,
the guided light incident to the optical waveguide as a fundamental wave is wavelength converted into a second harmonic wave, and the second harmonic wave is transmitted through the second surface of the substrate.

60. An integrated unit comprising:

a coherent light source including a semiconductor laser and an optical waveguide device, the optical waveguide device comprising a substrate having first and second surfaces, and an optical waveguide provided on the first surface of the substrate, the optical waveguide having a light-incoming facet and a facet inclined with respect to the optical waveguide;

a photodetector for detecting light associated with the light transmitted from the optical waveguide device; and a submount wherein the coherent light source and the photodetector are provided on the same surface of the submount, wherein guided light incident to the optical waveguide through the light-incoming facet is totally refelected off the inclined facet, and the guide light is transmitted through the second surface of the substrate, and light from the semiconductor laser is incident to the optical waveguide.

61. An integrated unit according to claim 60, further comprising a light shielding member provided between the coherent light source and the photodetector.

62. An integrated unit according to claim 60, wherein a height of a surface of the photodetector is higher than a surface on a light-exiting side of the coherent light source with reference to a surface of the submount.

63. An integrated unit according to claim 60, wherein a concave portion is provided in a surface of the submount, and the coherent light source is provided in the concave portion.

64. An optical pickup comprising:

an integrated unit according to claim 60; and

A focusing optical system for converging light transmitted from the integrated unit, wherein a diffraction grating is provided on a surface of the optical waveguide device of the integrated unit, the guided light being transmitted through the surface.

65. An optical pickup according to claim 64, wherein the photodetector of the integrated unit is divided into at least three regions including a first region positioned at a middle of the photodetector, and second and third regions on opposite sides of the first region, the second and third regions with respect to the first region are provided in a direction substantially perpendicular to a grate of the diffraction grating.

66. An integrated unit comprising:

a coherent light source including a semiconductor laser and an optical waveguide device, the optical waveguide device comprising a substrate having first and second surfaces, and an optical waveguide provided on the first surface of the substrate, the optical waveguide having a light-incoming facet and a facet inclined with respect to the optical waveguide;

a photodetector for detecting light associated with the light transmitted from the optical waveguide device; and a submount having a first and a second surface opposite the first surface wherein the coherent light source is provided on the first surface of the submount and the photodetector is provided on the second surface of the submount, wherein guided light incident to the optical waveguide through the light-incoming facet is totally reflected off the inclined facet, and the guided light is transmitted through the first surface of the substrate, and light from the semiconductor laser is incident to the optical waveguide device.

67. An integrated unit comprising:

a coherent light source including a semiconductor laser and an optical waveguide device, the optical waveguide device comprising a substrate having first and second surfaces, and an optical waveguide provided on the first surface of the substrate, the optical waveguide having a light-incoming facet and a facet inclined with respect to the optical waveguide;

a concave package wherein the coherent light source is provided in the concave package; and a transparent substrate for sealing the concave package wherein a diffraction grating is provided on a surface of the transparent substrate, wherein guided light incident to the optical waveguide through the light-incoming facet is totally reflected off the inclined facet, and the guided light is transmitted through the first or second surface of the substrate.

68. An optical pickup comprising:

an integrated unit according to claim 67; and a focusing optical system for converging light transmitted from the integrated unit.

69. An optical pickup comprising:

a semiconductor laser;

an optical waveguide device comprising a substrate having first and second surfaces, and an optical waveguide provided on the first surface of the substrate, the optical waveguide having a light-incoming facet and a facet inclined with respect to the optical waveguide;

two photodetectors for detecting light associated with light transmitted from the optical waveguide device;

a submount wherein the laser, the optical waveguide and the two photodetectors are provided on the submount;

a focusing optical system for converting the light transmitted from the optical waveguide device; and a diffraction element having lens action provided in the focusing optical system, wherein guided light incident to the optical waveguide the through the light-incoming facet is totally reflected off the inclined fact, and the guided light is transmitted through the first or second surface of the substrate, light from the semiconductor laser is incident to the optical waveguide device, and the two photodetectors are provided on opposite sides of the optical waveguide device, the two photodetectors each have at least a center portion and a peripheral portion, and the two photodetectors are irradiated with light diffracted by the diffraction element.

* * * * *

UNITED STATES PATENT AND TRADEMARK OFFICE
CERTIFICATE OF CORRECTION

PATENT NO. : 6,501,868 B1
DATED : December 31, 2002
INVENTOR(S) : Yasuo Kitaoka et al.

It is certified that error appears in the above-identified patent and that said Letters Patent is hereby corrected as shown below:

Column 36,
Line 15, "The" should be -- the --.

Column 38,
Line 17, "35" should be -- 34 --.
Line 24, "33" should be -- 35 --.
Line 47, "guide" should be -- guided --.

Column 40,
Line 42, ">" should be -- < --.

Column 41,
Line 39, "A" should be -- a --.

Signed and Sealed this

Eleventh Day of November, 2003

JAMES E. ROGAN
*Director of the United States Patent and Trademark Office*